United States Patent [19]
Swenson

[11] Patent Number: 5,914,138
[45] Date of Patent: Jun. 22, 1999

[54] APPARATUS FOR THROTTLE-VALVING CONTROL FOR THE CO-EXTRUSION OF PLASTIC MATERIALS AS INTERIOR CORE STREAMS ENCASED BY OUTER AND INNER STREAMS FOR MOLDING AND THE LIKE

[75] Inventor: Paul Swenson, So. Hamilton, Mass.

[73] Assignee: Kortec, Inc., Beverly, Mass.

[21] Appl. No.: 08/720,385

[22] Filed: Sep. 27, 1996

[51] Int. Cl.$^6$ .................................................. B29C 45/16
[52] U.S. Cl. ........................................ 425/130; 425/133.1
[58] Field of Search ................................ 425/130, 133.1, 425/573

[56] References Cited

U.S. PATENT DOCUMENTS

| | | | |
|---|---|---|---|
| 3,894,823 | 7/1975 | Hanning | 425/130 |
| 5,028,226 | 7/1991 | De'ath et al. | 425/130 |
| 5,131,830 | 7/1992 | Orimoto et al. | 425/130 |
| 5,143,681 | 9/1992 | Daubenbuchel et al. | 425/133.1 |
| 5,156,857 | 10/1992 | Wang et al. | 425/133.1 |

FOREIGN PATENT DOCUMENTS 46-16594  5/1971  Japan ...................................... 425/130

*Primary Examiner*—Jay H. Woo
*Assistant Examiner*—Robert Hopkins
*Attorney, Agent, or Firm*—Rines and Rines

[57] ABSTRACT

A multiple-plastic stream co-extruder as for injection-molding cavities, in which the extruder is internally provided therewithin and therealong with a restrictor or throttle pin, rod or element that forces combined plastic material streams, formed with an interior core stream encased in outer and inner stream layers, into corresponding concentric annular flow stream layers that are ultimately split transversely in opposite directions into a cavity gated to the extruder, and with the core stream at a region of zero gradient in the transverse flow velocity profile within the extruder and cavity.

16 Claims, 24 Drawing Sheets

APPARATUS FOR THROTTLE-VALVING CONTROL FOR THE CO-EXTRUSION OF PLASTIC MATERIALS AS INTERIOR CORE STREAMS ENCASED BY OUTER AND INNER STREAMS FOR MOLDING AND THE LIKE

FIELD OF THE INVENTION

The present invention relates to the co-extrusion of two or more streams of plastic materials and the like, as for introduction into molding apparatus or similar applications; being more particularly directed to the problems of providing better controlling of such co-extrusion and enabling more uniform molding of the extruded materials and with greater flexibility of the use of a wide range of different-proposed materials, extruding temperatures and other conditions.

With specific reference to injection systems for co-injecting at least two materials, the present invention relates to an improved technique and apparatus for combining the different flow streams of materials, wherein a velocity profile of the combined stream is produced in the melt delivery system that is similar to the velocity profile of the combined stream in the injection mold cavity, for insuring uniformity in the resulting molded item.

BACKGROUND OF INVENTION

A common problem in the field of co-injection molding resides in the need to keep the leading edge of the core (interior) layer as uniform with respect to thickness as trailing portions of the core (interior) layer entering the mold cavity. A tapered leading edge will produce a molded part that is not uniform in its properties near the position of farthest penetration of the interior layer.

Usually, the leading edge of the core (interior) layer becomes tapered as it flows through a cylindrical central channel of prior art co-injection nozzles disposed downstream of the combining area of the nozzle and as it flows through the cylindrical gate portion of the mold cavity. Typical of such nozzles are those described, for example, in U.S. Pat. Nos. 4,895,504 and 4,892,699.

The amount of taper depends on the velocity profile of the combined flow which causes a gradient of velocity between the radially innermost portion and the radially outermost portion of the leading edge. The amount of taper also depends on the total axial distance of cylindrical flow, between the area of combination and the cavity-end of the cylindrical gate.

To minimize the leading edge taper, such prior art nozzles have been constructed with a short axial flow distance between the area of combination and the cavity end of the cylindrical gate. Typically, this axial flow distance is between about 5 mm and 25 mm, and the resulting leading edge taper length is greater than about 1.8 mm for the shorter axial flow distance and 9 mm for the longer axial flow distance. This short axial flow distance requires that the combining means be part of the nozzle.

Another problem with the current art is that the outermost diameter of the co-injection nozzle close to the gate is larger than nozzle diameters used in single-material injection molding. This larger size requires a large clearance bore in the mold which makes it difficult to provide adequate cooling of the mold cavity near the gate. Some designs of current art use a combining means that has a conically or frustoconically-shaped portion to minimize the outermost diameter near the gate; even so, this diameter of the nozzle near the gate may be twice the size of a single material nozzle.

OBJECTS OF THE INVENTION

An object of the present invention is to provide a new and improved method of and apparatus for co-extrusion that shall not be subject to the above and other disadvantages of the prior art, but that, to the contrary, through a radically different conversion of the nozzle to a throttle-control extruder, provides for significantly improved, more uniform and more flexible operation.

Another object is to provide a novel extrusion apparatus in which a combined flow is produced having a velocity profile within and downstream of the area of combination of the extrusion materials which has a substantially zero gradient of velocity across the leading edge of the core (interior) layer, such velocity profile enabling the leading edge of the core (interior) layer to not become tapered, as in prior art nozzles, as it flows from the area of combination to the cavity end of the mold gate.

Still another object of the invention is to provide a novel apparatus in which the combining means is remote from the gate area of the nozzle so that mold design and mold cooling are not compromised.

A further object is the achievement of such novel results through radically converting prior art cylindrical nozzles designs into an extruder structure containing throttle or restrictor needles, rods or stems that force annular extrusion; and, in the case of inner core molding, create concentric outer and inner annular extrusion streams, with the core-forming annular stream encased within annular co-extruded outer and inner stream layers.

A further object is to provide such a novel extruder in which a gate vestige is left on the molded part which is as small as that which can be obtained by single material molding systems.

An additional object of the invention is to provide a novel co-extrusion method and apparatus wherein the velocity profile of the combined stream of the plastic materials downstream of the combining area is made substantially the same as the velocity profile of the combined stream in the cavity, so that improved part properties and improved cycle times are possible.

Other and further objects will be explained hereinafter and are more particularly delineated in the appended claims.

SUMMARY OF THE INVENTION

In summary, however, from one of its broader aspects, the invention embraces a method of co-extruding multiple plastic materials as for injecting through a gate region into a mold cavity to produce a molded product, that comprises, combining streams of such flowing plastic materials with at least one internal stream that is to serve as an interior core of a resulting molded plastic product within internal and outer streams of plastic material to serve as covering plastic material layers; restricting the combined streams to flow along concentric annular flow paths within and along a longitudinally extending tubular extruder to the cavity gate region, with the annular core stream encased by inner and outer annular covering plastic material stream layers; at the gate region, splitting the concentric annular streams along opposite transverse directions to inject into corresponding opposite transverse sections of the cavity.

Preferred and best mode embodiments and apparatus designs for practicing the novel method of the invention are hereinafter more fully described.

BRIEF DESCRIPTION OF THE DRAWINGS

The invention will now be described in connection with the accompanying drawings, FIG. 1 of which shows a cross-section of a complete system including source of materials, material distribution and combination system and mold cavity;

FIGS. 29(a)–(d) again are similar to FIGS. 27 and 28, but show the fill sequence for a core (interior) layer wherein the maximum amount of core is injected into the molded part using a combining means designed to produce an outer layer flow at a greater rate relative to the inner annular layer to effect a thicker outer layer on the gate side of the molded part; while

PREFERRED EMBODIMENT(S) OF INVENTION

Figure 1:
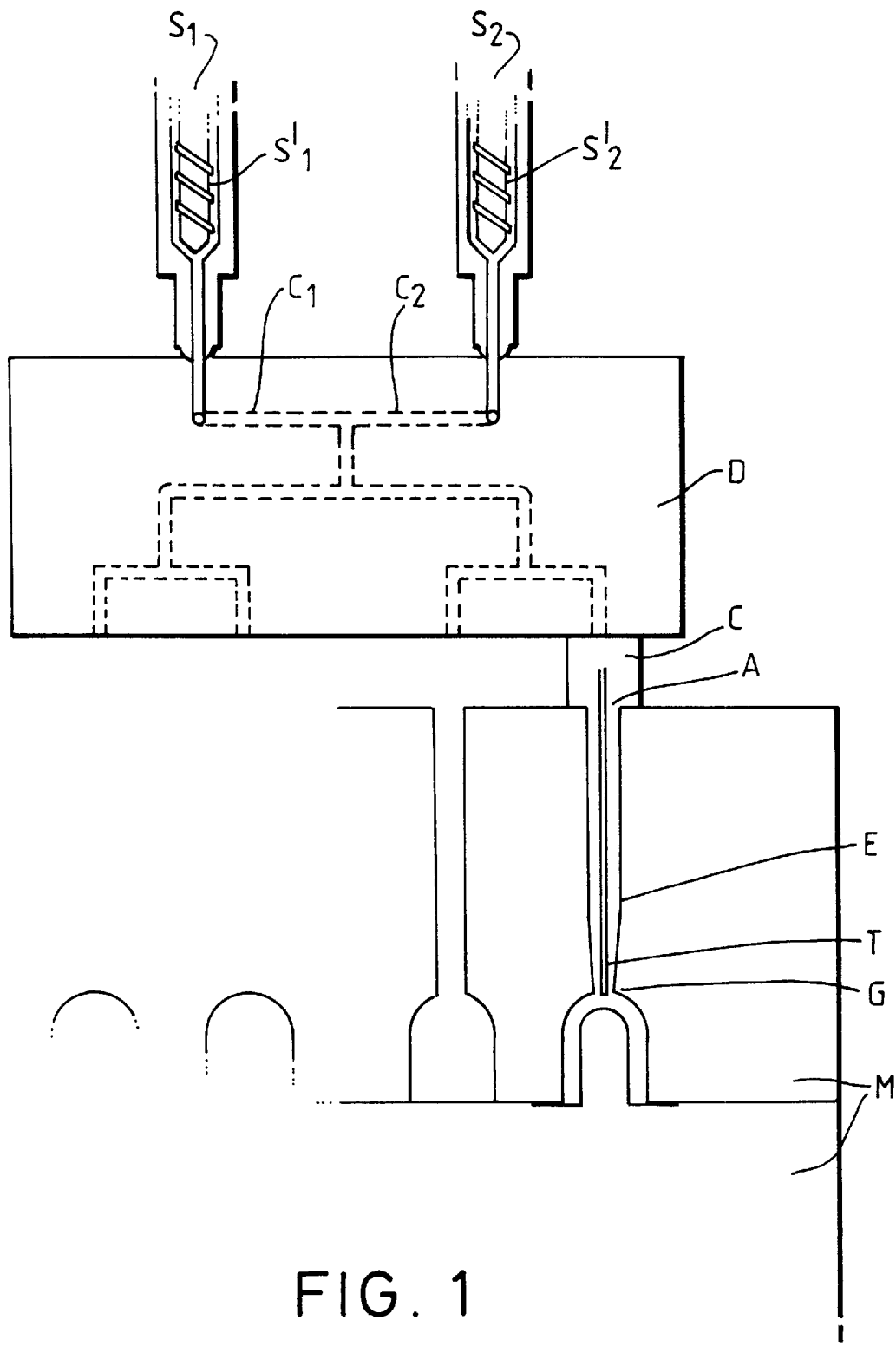

Referring to FIG. 1, and in the exemplary context of the invention as applied to plastic, (such as PET, EVOH, polycarbonates and the like) co-injection molding systems adapted to inject at least two materials into a cavity of a mold, the system comprises respective sources $S_1$ and $S_2$ for each material, a means, such as a manifold D, for delivering each material stream to a combining means C upstream of each gate of the mold, and a novel throttle valve controlling extruder nozzle means E for delivering the combined stream to the gate into the mold M. The sources $S_1$ and $S_2$ for each material are shown as reciprocating screw injection units; the means for delivering the material streams is a manifold block M with respective separate flow channels $C_1$ and $C_2$ for each material arranged such that the flow is balanced and equal to each; the combining means C is disposed upstream of the throttle nozzle means E with its internal co-extensive throttle needle T which delivers the combined stream to each gate region G of the mold M. In the embodiments disclosed herein, FIG. 2, the streams forming each layer L of the molded product are combined in an annular channel A of the combining means C so that the leading edge of the core (interior) layer I is disposed in the zero velocity gradient portion of the combined flow stream, as later more fully explained. The longitudinally extending-extruder nozzle means E with its central longitudinal throttle needle or flow restrictor T downstream of the combining means C provides an uninterrupted continuation of the annular flow developed in the combining means.

Figure 2:
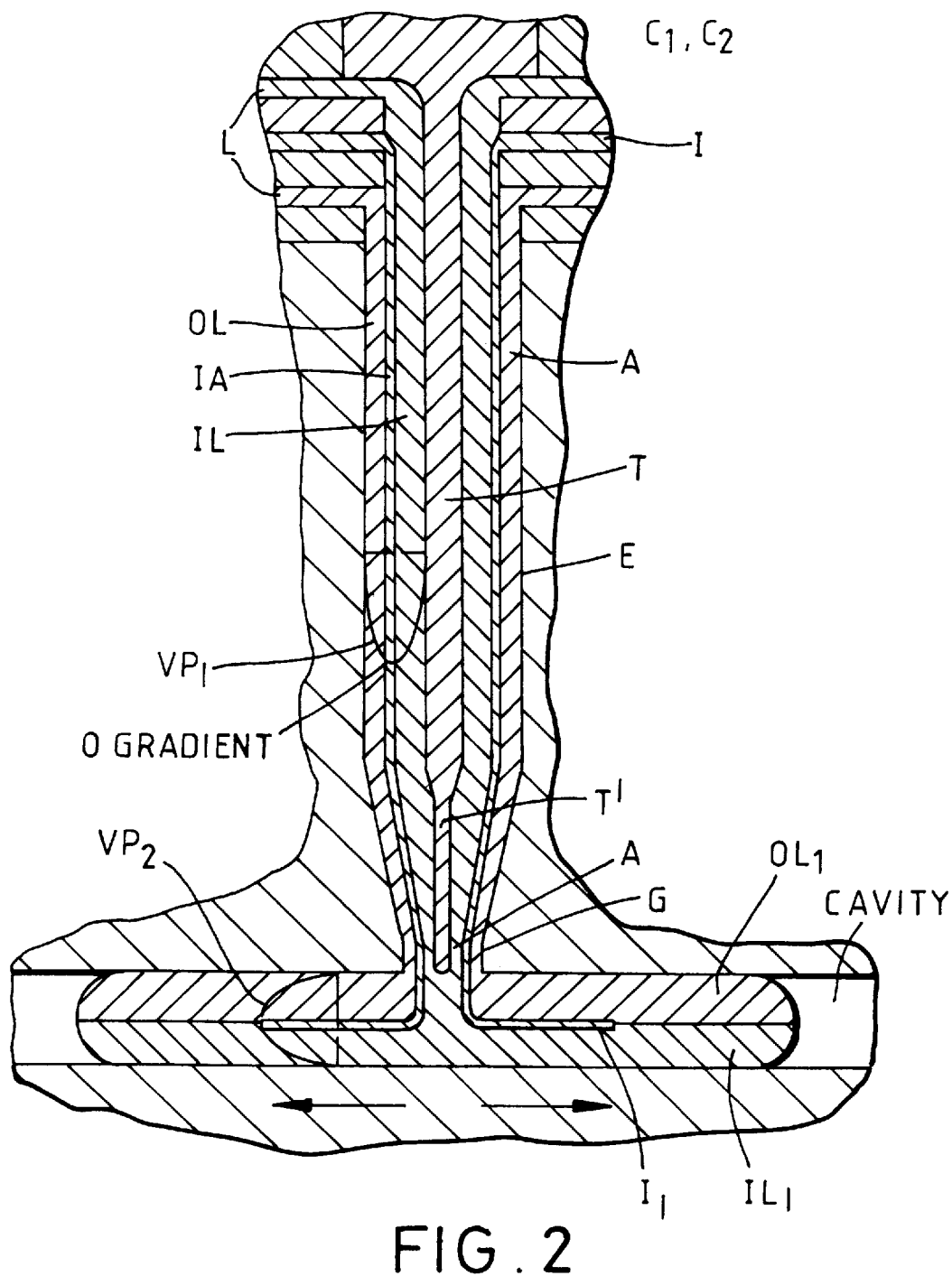
FIG. 2 is a cross-section of flow from the material combination area to the mold cavity, showing that the core (interior) layer flows along the zero-gradient of the velocity profile in accordance with the technique and construction of the present invention.

In the three-layer combined flow stream embodiment of FIG. 2, two materials L and I are provided, each from its own source; the first material L, which forms the outer or covering layers $OL_1$ and $IL_1$ of the molded part, forms the inner and outer layers Ol and IL of the annular flow combined stream at A, formed by the presence of the central throttle T; the second material I, which forms the core (interior) layer $I_1$ of the molded part, forms the middle or inner or interior annular layer IA of the annular flow combined stream A. The first material L is delivered through its flow channel to the combining means C wherein it is divided from a single stream into two streams, one forming the aforesaid inner annular layer IL of the combined annular flow stream and the other forming the aforesaid outer annular layer OL. The second material I is delivered through its flow channel to the combining means C wherein it is disposed to form the middle or interior annular layer IA of the concentric annular flow combined streams, as also shown in the annular flow channel cross section of FIG. 3. Preferably, as shown, the throttle needle or central restrictor is of reduced diameter T' at the extruder opening distal end at the cavity gate injection end of the nozzle. The nozzle means thus has an internal bore which surrounds the throttle valve pin to form an annular channel to deliver the combined flow stream to the gate while maintaining the aforesaid velocity profile. By disposing the core (interior) layer material to be in the zero gradient of the velocity profile $VP_1$, the leading edge of the core (interior) layer does not become tapered regardless of the axial flow distance between the combining means and the gate into the cavity. The nozzle axial length, unlike in prior art nozzles, can accordingly be made as long as required to provide for good mold cooling. The outermost diameter of the nozzle is typically no larger than that required for single-material molding, thereby not compromising mold design or mold cooling. This embodiment, moreover, also makes it easier to convert a mold designed for single-material molding to be used for co-injection. At the gate region G adjacent the proximal distal end of the restrictor or throttle needle, rod or element T', the annular flow streams are laterally split and flow is injected in opposite directions transversely into the corresponding opening sections of the mold cavity, as shown by the arrows in FIG. 2.

In this and later-described embodiments that dispose the material forming the core (interior) layer of the molded part to be the middle layer of the combined flow stream, a part can be readily molded with its core (interior) layer at a melt temperature that is lower than the outer layers of the molded part. In single layer molding, on the other hand, the temperature of the material as provided at its source must be high enough 1) to lower its viscosity for ease of flow between the walls of the injection cavity and 2) to produce a good cosmetic appearance on the outer surfaces of the molded part. Because the material of a single layer molded part is provided by a single material source, the temperature of its interior layer will be the temperature needed for ease of cavity flow and surface appearance, and the cooling time needed to cool the interior of the molded part is dependent on the melt temperature provided by the source. Using the present invention, however, the core (interior) layer can be provided at a temperature much different than the temperature of the outer layer material, thereby producing several unexpected improvements compared to single layer molding. While some other prior art systems can also permit this effect, it is particularly simply and efficiently effected with the technique and construction of the invention.

Improvements that can be produced by providing the outer layers at normal or higher than normal temperature and the core (interior) layer at a correspondingly lower temperature include:

1) cavity fill pressure will be lower because the outer layer viscosity will be lower than normal;

2) part surface appearance will be improved because of the hotter outer layer melt temperature;

3) cooling time, and thereby cycle time, will be reduced if the relative increase in outer layer melt temperature is less than the corresponding core (interior) layer melt temperature decrease, such that the total heat content of the combined melt is less than normal for a single-material molding;

4) an increased core (interior) layer melt viscosity will increase the core (interior) layer volume relative to a decreased outer layer volume if that is a desirable property of the molded part; and 5) a core (interior) layer material can be used that has a higher coefficient of thermal expansion than that of the outer layers without causing undue molded-in stresses, etc.

Other improvements can be produced by providing differing relative melt temperatures of the core (interior) and outer layers materials. One such reason is to control relative shrinking between layers when the core (interior) layer has a different coefficient of thermal expansion than the outer layers material. Another reason is to produce parts that have lower molded-in stresses by using temperature differences to reduce relative shrinkage between the core (interior) and outer layers without affecting part surface cosmetic appearance.

Figure 3:
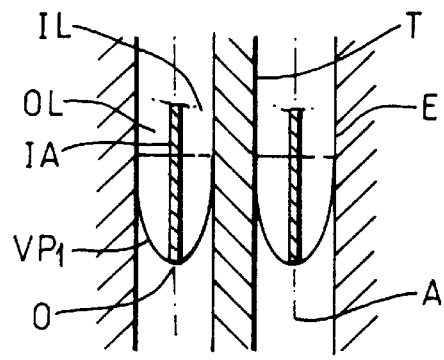
FIG. 3 illustrates in cross-section the annular flow channel of this construction, also showing the core (interior) layer along the zero-gradient of the velocity profile.
Figure 4:
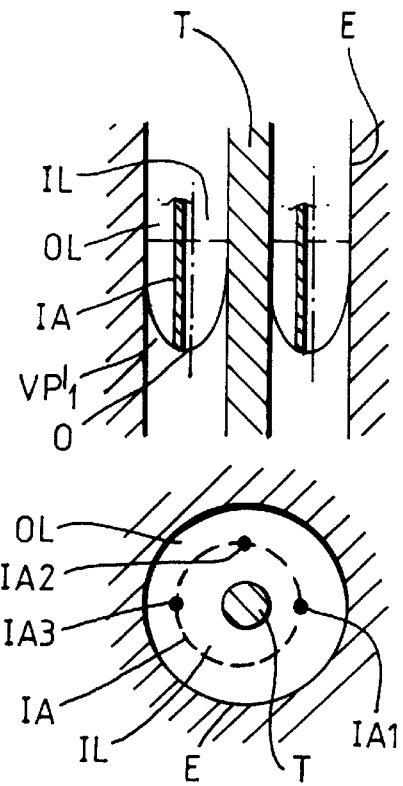
FIG. 4 is a cross-sectional view of an annular flow channel as in FIG. 3, but with maldistributed outer and inner annular flow layers causing the core (interior) layer to be offset from the median of the annular diameters.
Figure 5:
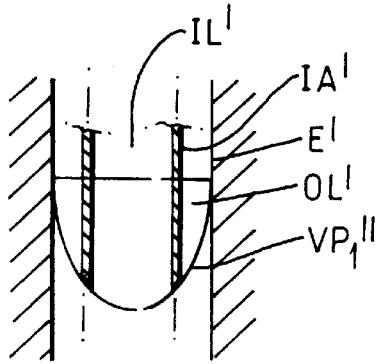
FIG. 5 presents a cross-section of prior art cylindrical flow showing the core (interior) layer in an area of high gradient of velocity, to contrast from the conditions of the invention as presented in FIGS. 3 and 4.
Figure 5:
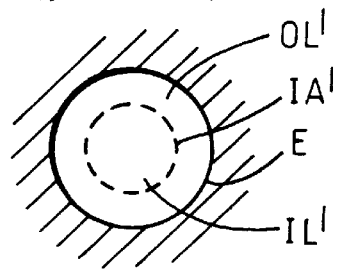

Returning to the flow distribution illustrated in FIGS. 2 and 3, the extruder structure of the present invention can accommodate for maldistributed or unsymmetrical outer and inner annular flow layers that, as shown in FIG. 4, may cause the core (interior) annular layer IA to be offset from the median of the annular diameters of the encasing inner and outer layers IL and OL. From the velocity profile $VP_1'$ of FIG. 4, it will be observed that the core, though offset, is none-the-less close to the zero gradient velocity profile, still enabling improved results. This is to be contrasted from the cylindrical flows in prior art nozzles E', shown in FIGS. 5 and 6, for symmetrical and unsymmetrical conditions, and wherein the core layer is subjected to areas of high gradient of velocity in the profiles $VP_1''$ and $VP_1'''$, with the attendant limitations and disadvantages previously discussed.

Figure 7:
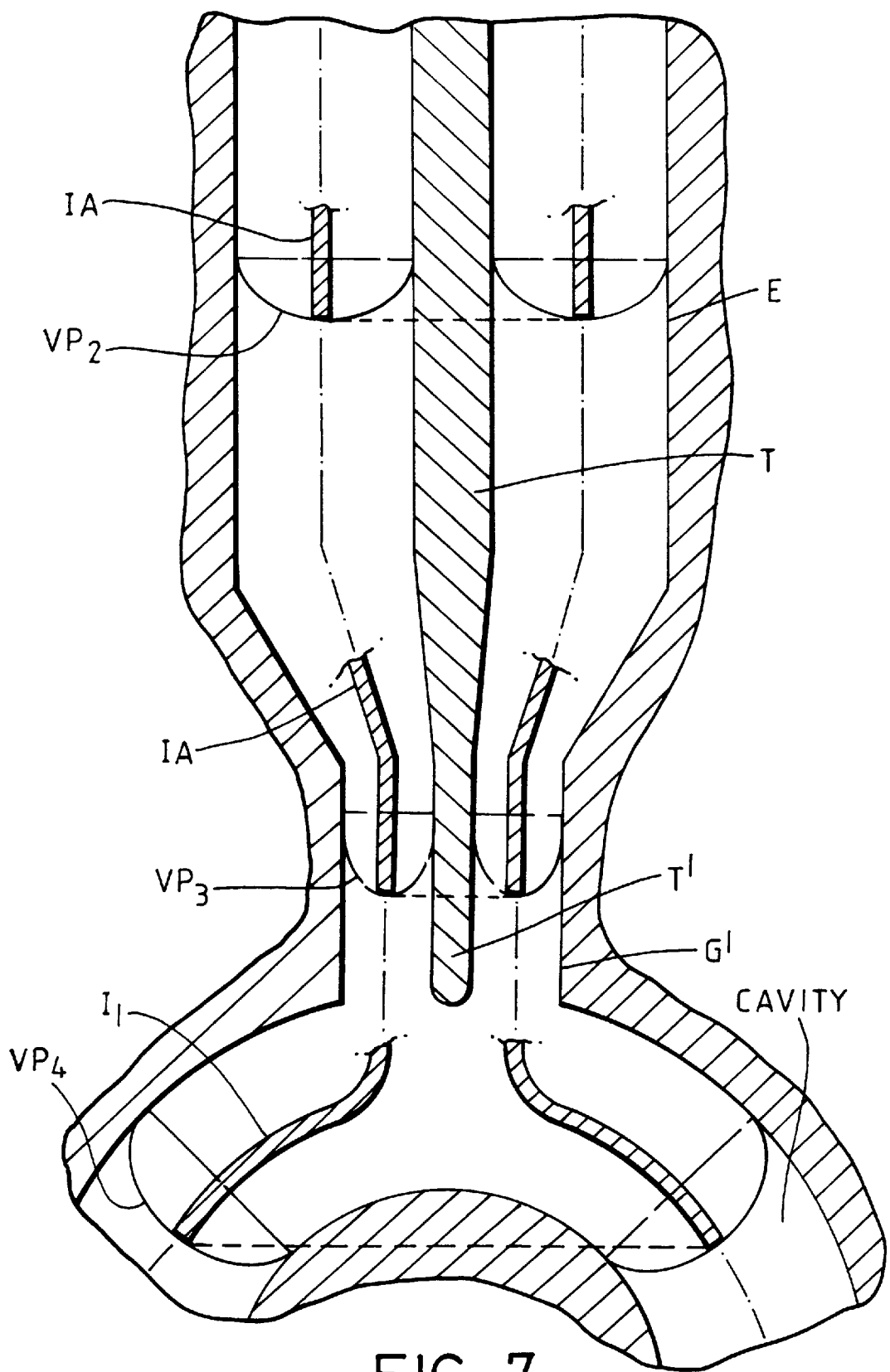
FIG. 7 is a cross-sectional view showing velocity profiles of core (interior) layer in annular flow nozzle area, annular flow gate area and cavity.

In the throttled or centrally restricted co-extruder of FIG. 7, wherein the extruder E is shown connected to an annular flow gate G' and cavity, the velocity profiles of the annular core layer IA in the annular extruder area ($VP_2$) and in the annular flow gate area ($VP_3$) and in the cavity ($VP_3$) are all presented, demonstrating the maintaining of zero gradient throughout the flow and cavity injection process of the invention. Substantially these benefits are also obtained in the event of misalignment or maldistribution of outer and inner layer flow, FIG. 8, with the effect illustrated of maldistributed outer and inner layer flow on the relative position $\Delta l$ of leading edge of the core (interior) layer in the mold cavity.

Figure 8:
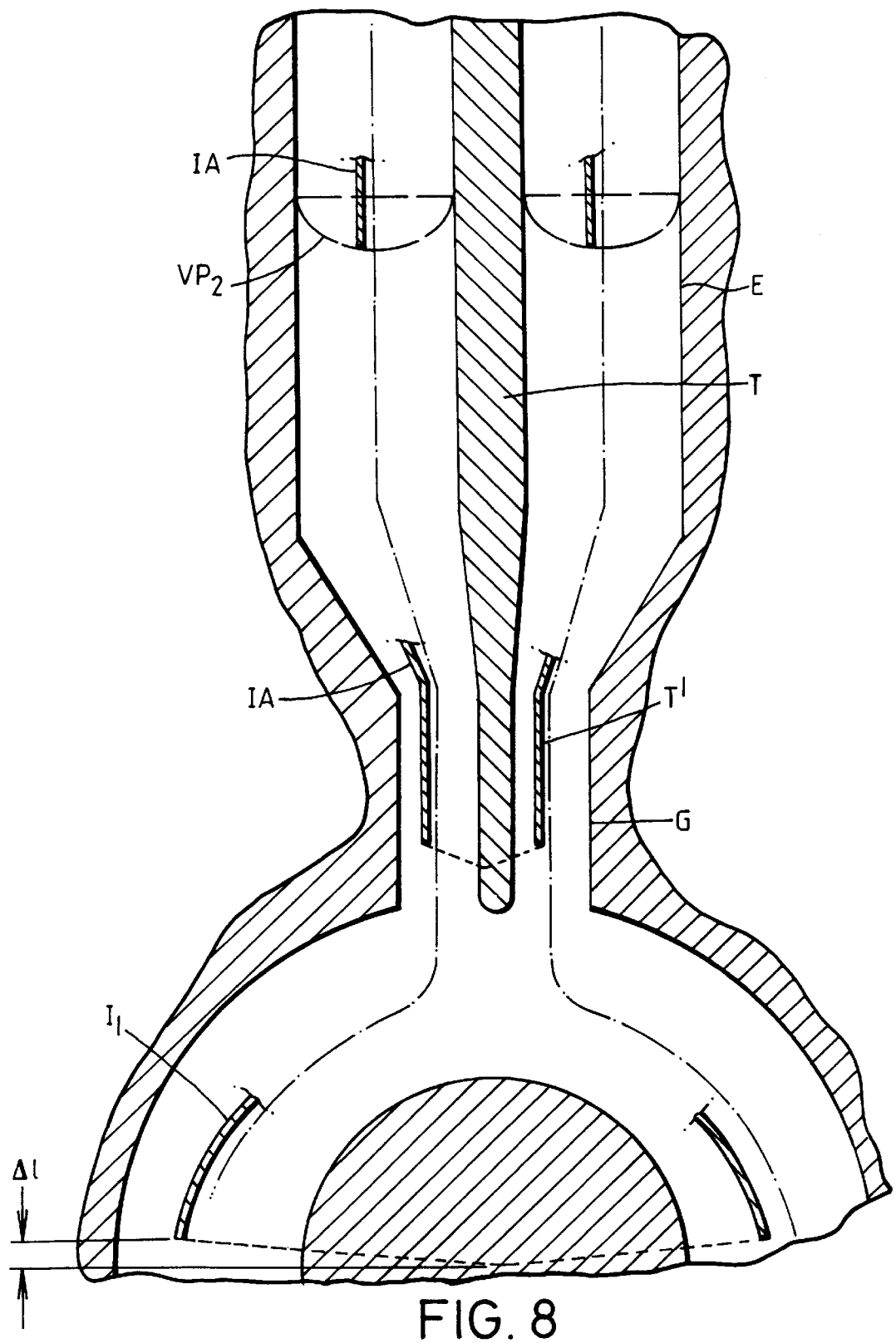
FIG. 8 is similar to FIG. 7, showing, however, the effect of maldistributed outer and inner layer flow on the relative position of leading edge of the core (interior) layer in the mold cavity.
Figure 9:
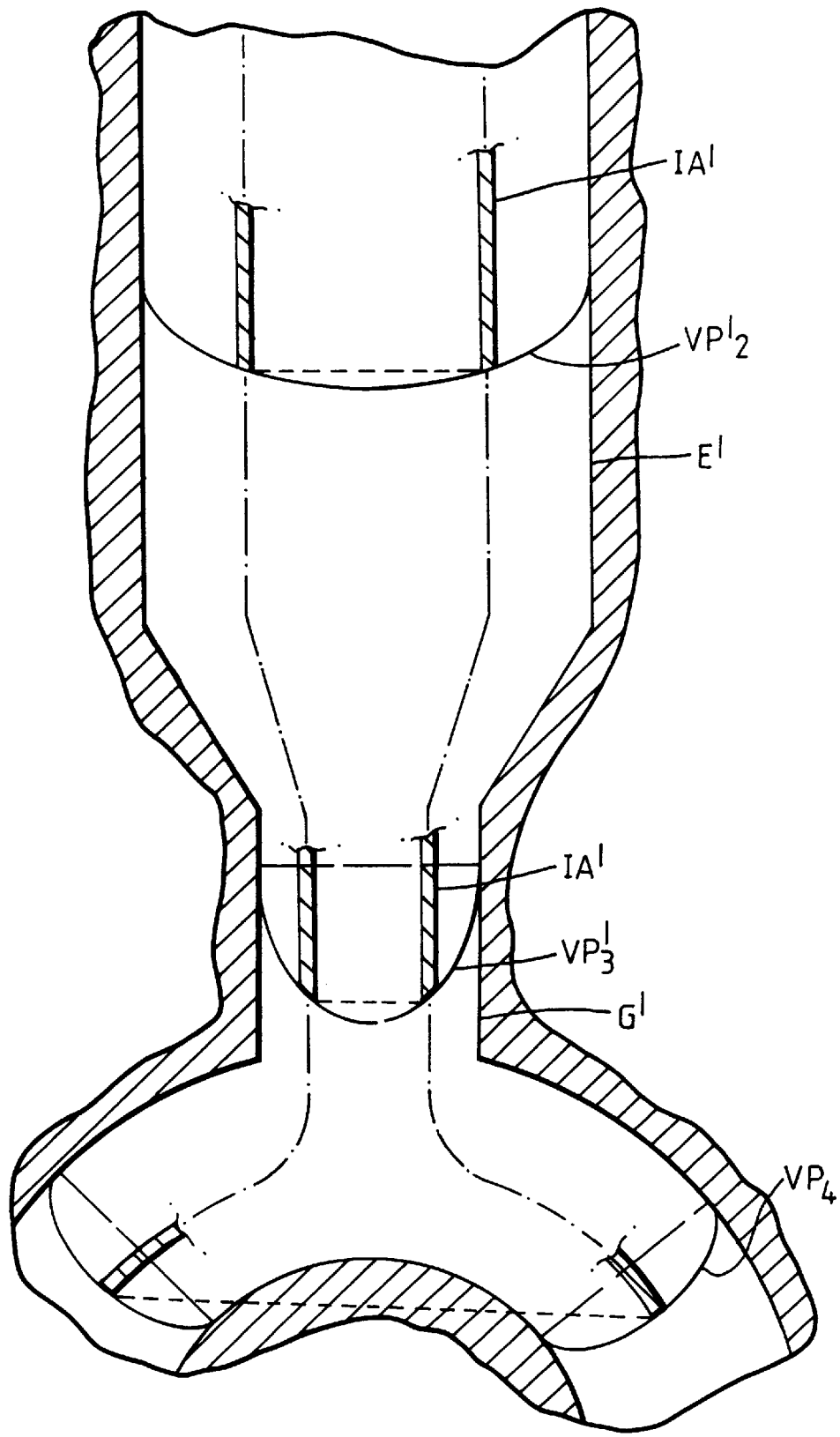
FIGS. 9 and 10 are views similar to respective FIGS. 7 and 8, but showing prior art cylindrical flow in nozzle gate and cavity.
Figure 10:
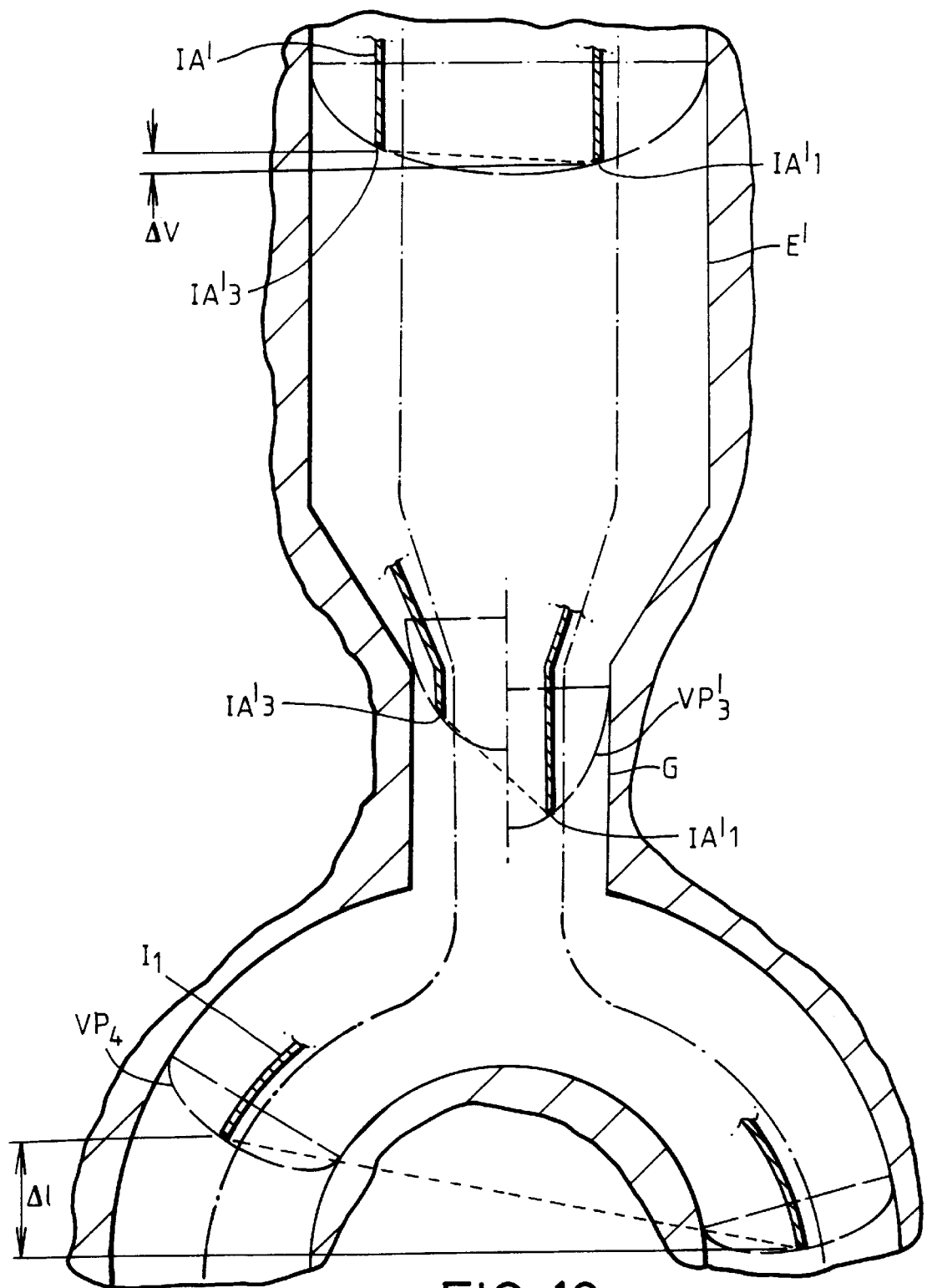

FIGS. 9 and 10 show prior art cylindrical nozzles corresponding, respectively, to the extruder of the invention shown in FIGS. 7 and 8, and illustrate the undesirable high gradients of velocity for the flow of the core (interior) layer in the nozzle E' ($VP_2'$) and at the gate ($VP_3'$), with zero gradient of the velocity profile attained only in the cavity ($VP_4$).

FIG. 10 shows the development of the core leading edge taper caused by the effect of the velocity difference across the maldistributed core leading edge as it flows through extruder E'. As leading edge streamline IA'1 flows at a higher velocity than 1A'3, $\Delta l$ taper results by time the core enters the cavity through gate G'. Even though the core layer $I_1$ remains offset from the cavity flow centerline, the velocity difference across the tapered leading edge in the cavity remain small, so that the increase in $\Delta l$ within the cavity is small compared to the $\Delta l$ developed in the prior art extruder E'.

Figure 11:
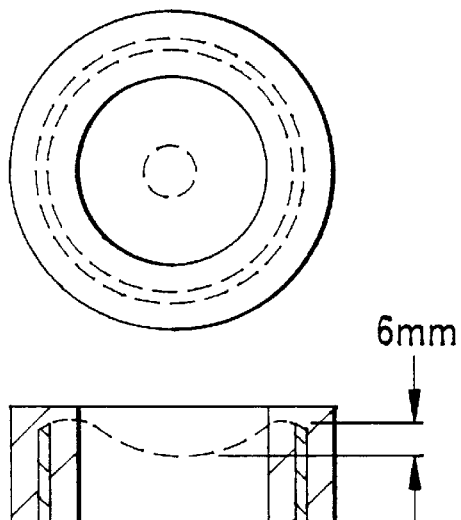
FIG. 11 is a cross-sectional view of a molded part formed by the structure of the invention, showing the amount of leading edge taper caused by annular flow length in FIG. 8 of 75 mm from combination area to cavity side of gate, when the inner and outer maldistribution is 10%.
Figure 11:
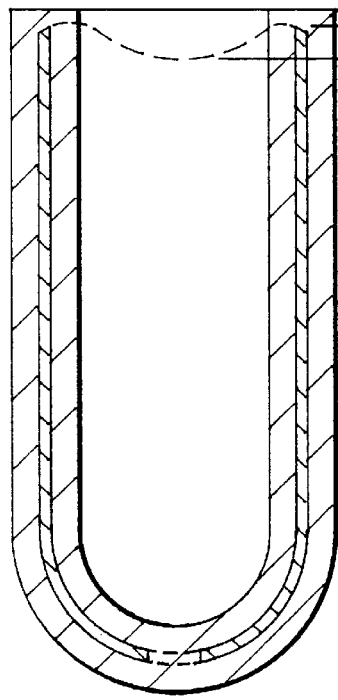
Figure 12:
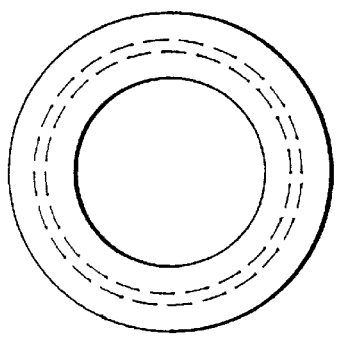
FIG. 12 is a view similar to FIG. 11 but of a molded part made by the prior art cylindrical nozzle structure, FIG. 10, showing the amount of leading edge taper caused by cylindrical flow inner and outer maldistribution of 10%.
Figure 12:
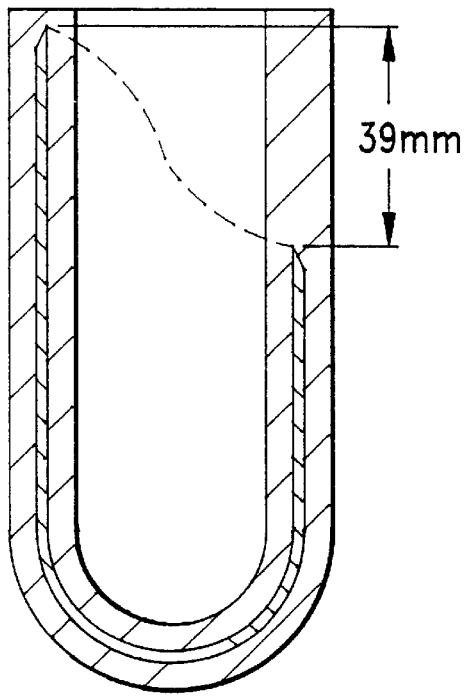

Further to contrast the significantly improved molding results and tolerances attainable with the annular flow construction of the invention with the prior art cylindrical nozzles, FIG. 11 illustrates the minimal acceptable amount of leading edge taper carried in a molded part for a 10% inner and outer flow maldistribution with the annular flow of the structure of the invention (FIG. 8) for an annular flow length of 75 mm from combination area C to the cavity-side of the gate G; whereas FIG. 12 shows the much greater leading edge taper in the molded part that the art has had to accept with prior cylindrical flow nozzles for the same 10% maldistribution with a cylindrical flow length of 75 mm from combination area to cavity-side of the gate (FIG. 10).

Figure 6:
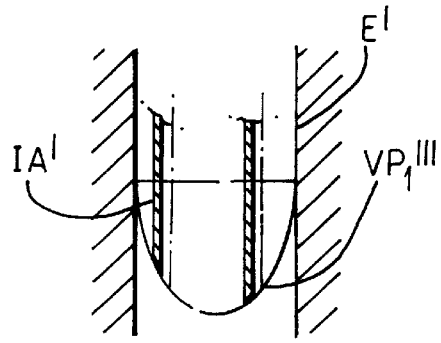
FIG. 6 is similar to FIG. 5 but shows prior art cylindrical flow with maldistributed outer and inner layers.
Figure 6:
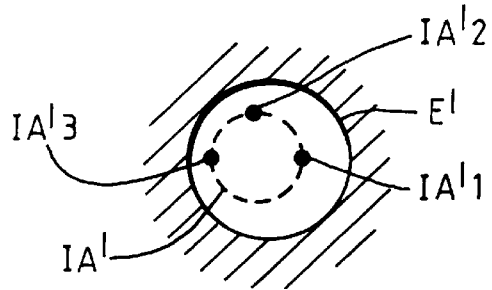
Figure 34:
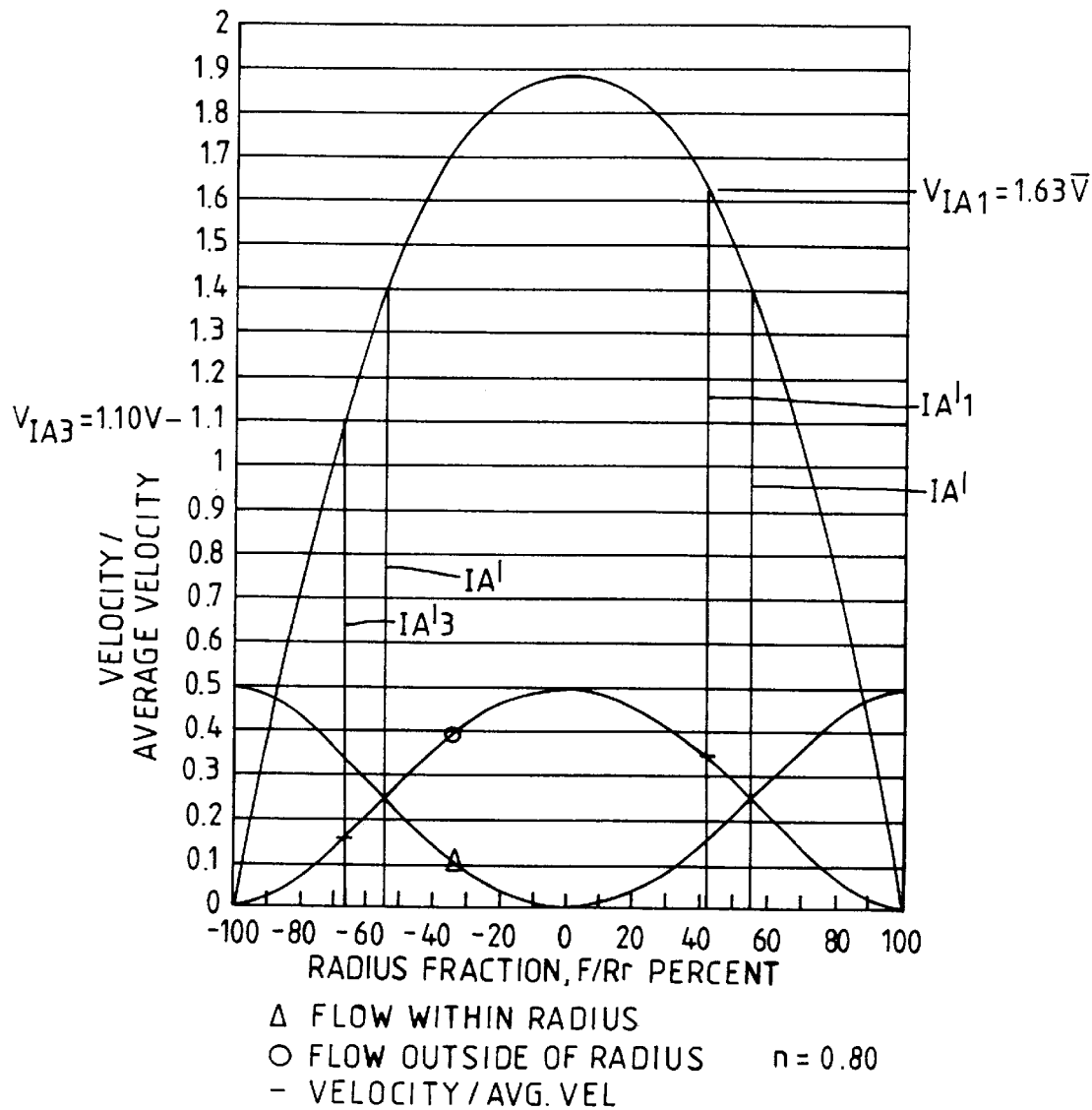
FIG. 34 is a graph plotting velocity/average velocity and flow fraction in a prior cylindrical channel for comparison with the results of FIG. 33.

To achieve a minimal acceptable amount (6 to 6 mm) of leading edge taper as shown in FIG. 11 when using prior art, the length of combined flow in the central channel from the area of combination to the surface of the molded part should not exceed about 11 mm if the maldistribution of inner and outer flow is as shown in FIG. 6 and FIG. 34. To provide for a minimal amount of mold cooling near the gate, the short length of the prior art central channel requires that the shape of the combining means be conical or frustoconical. Such shape still requires the distal end of the nozzle to be nearly twice the outside diameter of a single-material nozzle, thus causing part cooling near the gate to be compromised.

Figure 13:
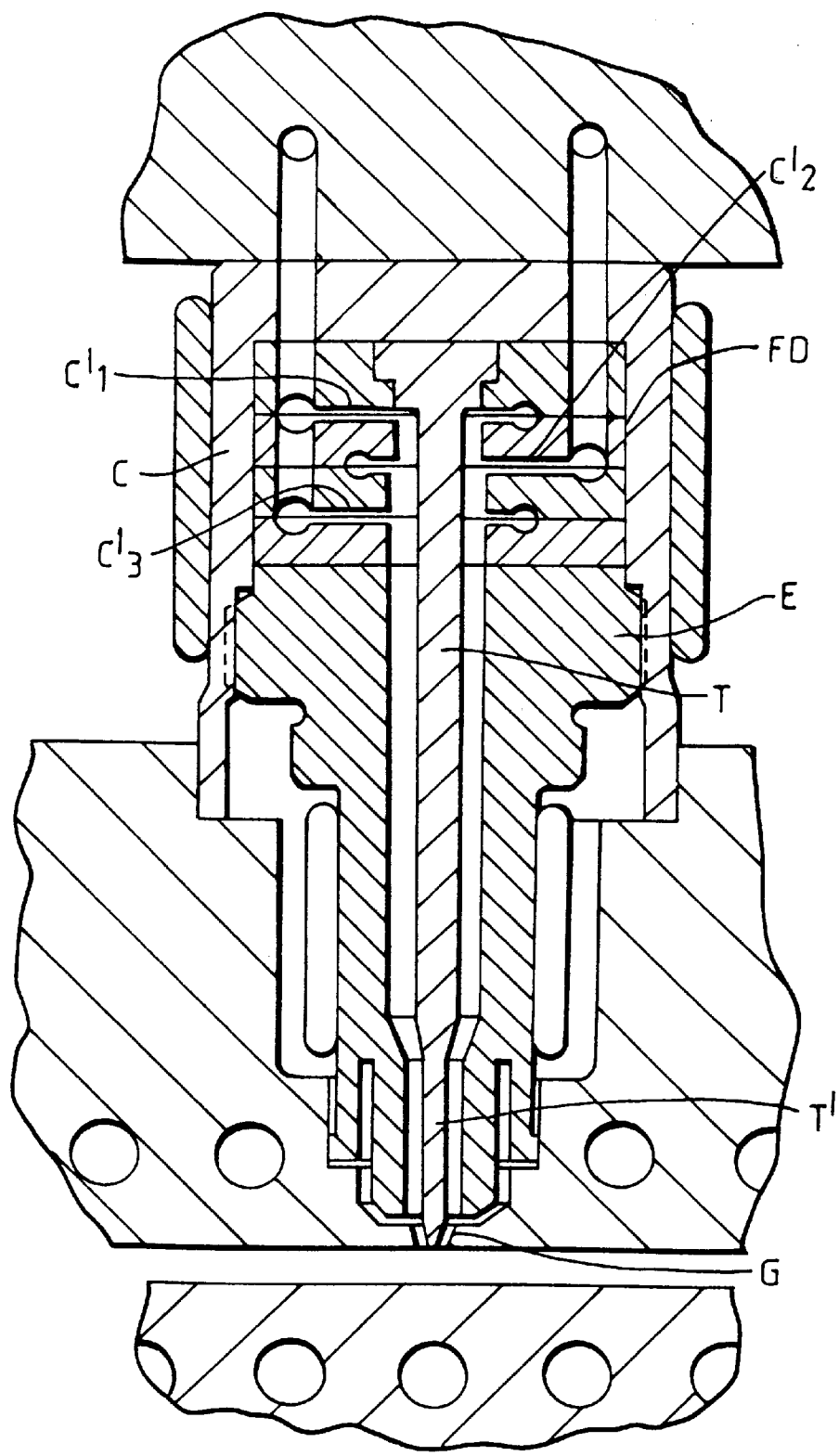
FIG. 13 is a cross-section of a modified extruder constructed in accordance with the invention and in which the flow from the manifold is through a flat disc combining means with a fixed throttle valve means, through the annular flow nozzle and gate into the cavity.

FIG. 13 illustrates another embodiment of the invention wherein the three layer combining means consists of four flat discs FD surrounding a central fixed throttle valve pin T-T' which forms the inner flow channel wall for the inner layer of the combined flow stream. Flow channels $C_1'$, $C_2'$, etc. are created between the three mating planar surfaces of the discs FD uniformly to dispose each flow layer to produce a uniform flow of the respective material flowing from each channel into the area of combination C, so that each layer of the combined flow stream is uniformly annularly disposed as it flows from the combining means through the extruding restricted or throttled nozzle means E and gate G into the cavity.

Figure 14:
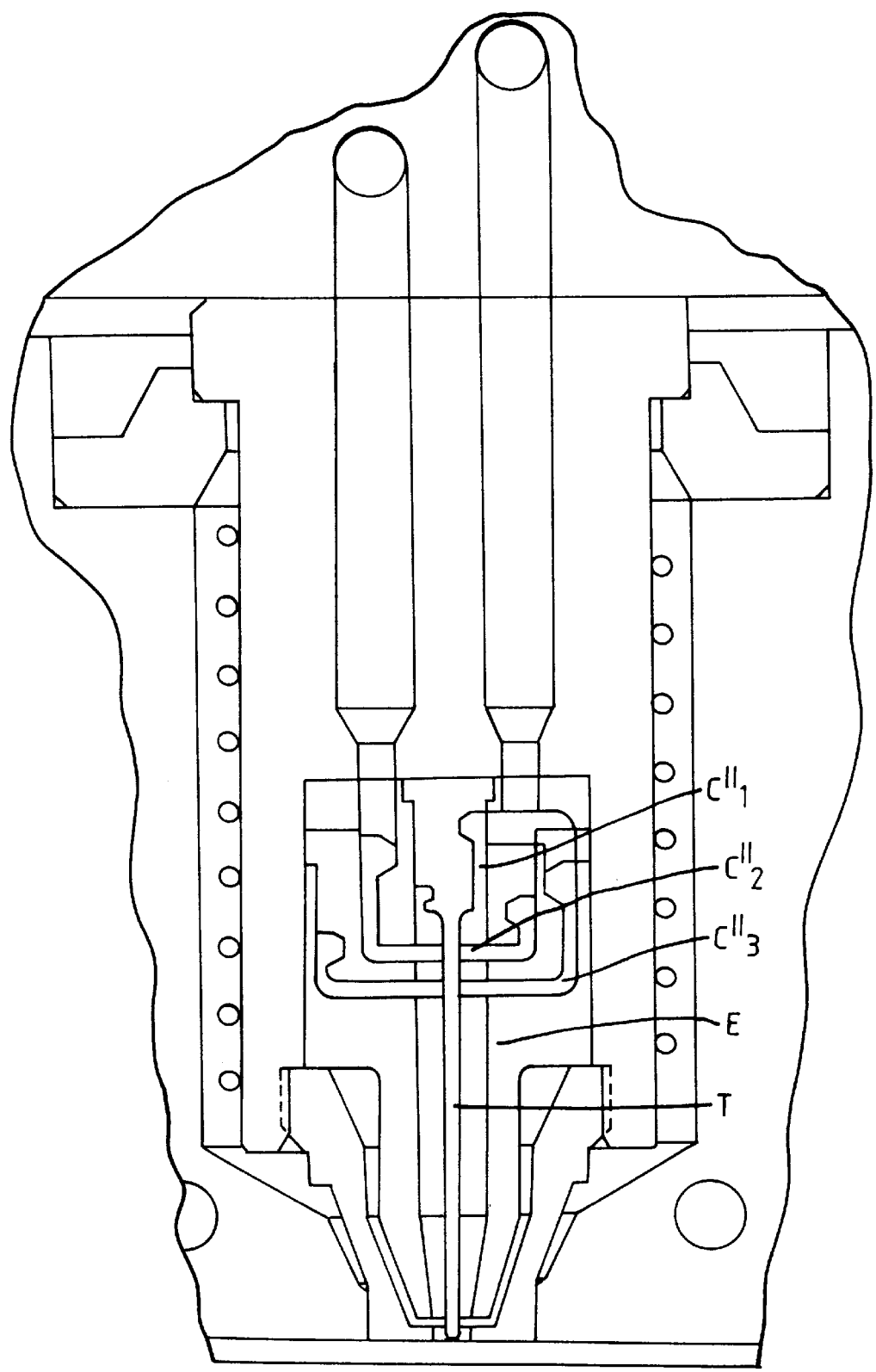
FIG. 14 is a cross-sectional view of a further modification in which an axial combining means is provided and with a fixed throttle valve means as part of the nozzle itself

The manifold combining means may, moreover, be incorporated as part of the extruder nozzle structure itself as shown, for example, in FIG. 14, wherein axial combining channels $C_1''$, $C_2''$, etc. are provided at the top of the extruder E itself, with a fixed throttle valve T extending along and within the extrusion nozzle.

Figure 15:
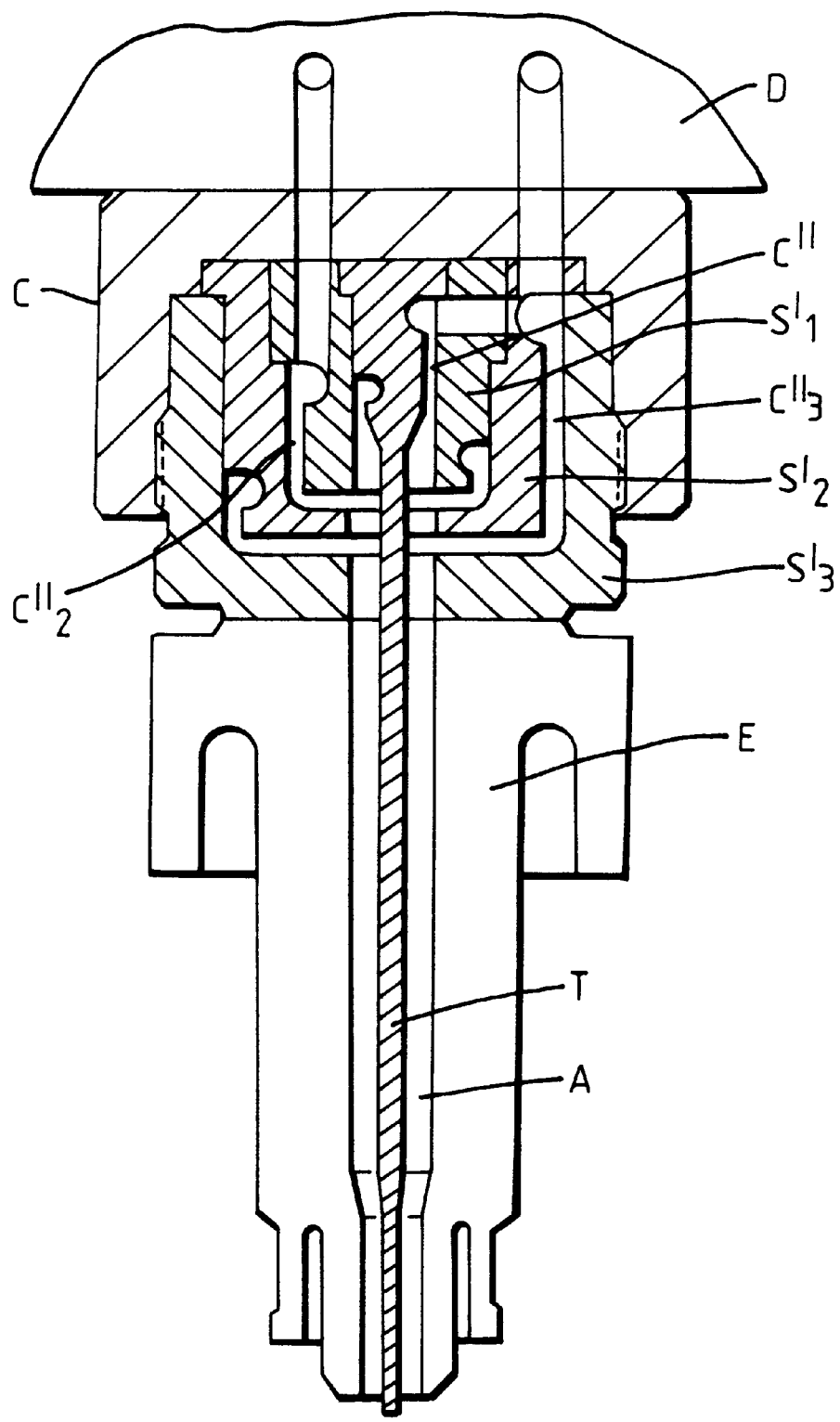
FIG. 15 is a more complete cross-section of the axial combining means with the fixed throttle valve means of FIG. 14, being a cross-sectional view of a combing means consisting of 3 concentric axial cylinders around a central fixed throttle valve means which extends through the combination area, through the separate nozzle and through the gate into the mold.

Another embodiment (shown in FIG. 15) uses three concentric shells $S_1'$, $S_2'$ and $S_3'$ surrounding a central throttle pin T which forms the inner flow channel wall for the inner layer of the combined flow stream. The flow channels created between the shells and between the innermost shell and throttle valve pin are designed to produce a uniform flow of the respective material flowing from each channel into the area of combination so that each layer of the combined flow stream is uniformly annularly disposed as it flows from the combining means through the nozzle means into the cavity. In this embodiment, the combining means C is a separate assembly sandwiched between the delivery manifold D and the extruder nozzle E. This allows the extruder nozzle to be identical in design as those used in single material molding. The combining means is coaxial with respect to the extruder nozzle so that the throttle pin T and the cylindrical wall of the extruder nozzle form a uniform annular channel A.

Figure 16:
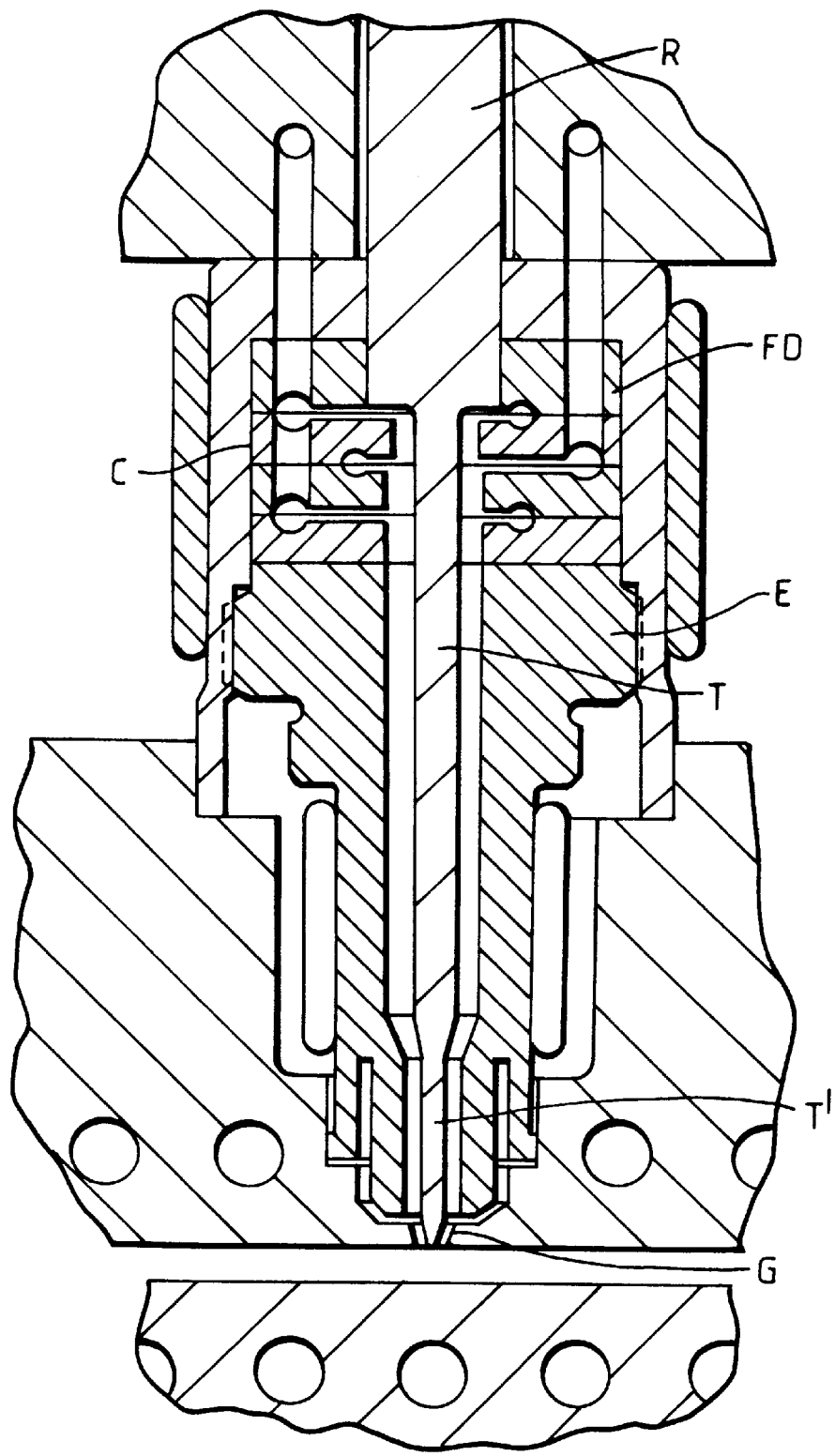
FIG. 16 is a view similar to FIG. 13, but showing a moveable throttle valve means.

While the centrally longitudinally extending restrictors or throttle pins heretofore described have been shown as fixed, as, for example, in the embodiment of FIG. 13, they may also be made movable, as by an adjusting rod R, FIG. 16, for various useful throttle valving or adjusting purposes, providing further flexibility not present in prior art cylindrical nozzles.

The moveable throttle or restrictor valve pin T-T' can vary the percentage of the outer layers material in the inner annular flow layer vs. the outer annular flow layer of the combined flow stream downstream of the combining area. Changing the relative volumes of the outer layers shifts the position of the core (interior) layer in the mold cavity to produce a part with controlled outer layer thickness on both surfaces of the molded part. If the outer layer flow is evenly distributed between the inner annular flow layer and outer annular flow layer, the outer layer thickness will be similar on both surfaces of the molded part. If the outer layer flow is biased toward either the inner of outer annular flow layers, the outer layer thickness in the molded part will be similarly biased on the corresponding surface molded from the biased annular layers. Material from the inner annular flow layer forms the outer layer of the part molded by the cavity wall opposite the gate into the cavity, and the material from the outer annular flow layer forms the outer layer of the part molded by the cavity wall adjacent to the gate.

The use of a moveable throttle valve pin is typically appropriate in cases where it is advantageous to vary, during each injection, the relative percentage of the outer layers material in the inner annular flow layer vs. the outer annular flow layer. The moveable throttle pin is not used to initiate nor to terminate the flow of any material for any layer. For cases where the relative thickness of the outer layer on both surfaces of the molded part can remain in fixed proportion to each other, the embodiment uses a non-moving throttle valve pin.

Figure 17:
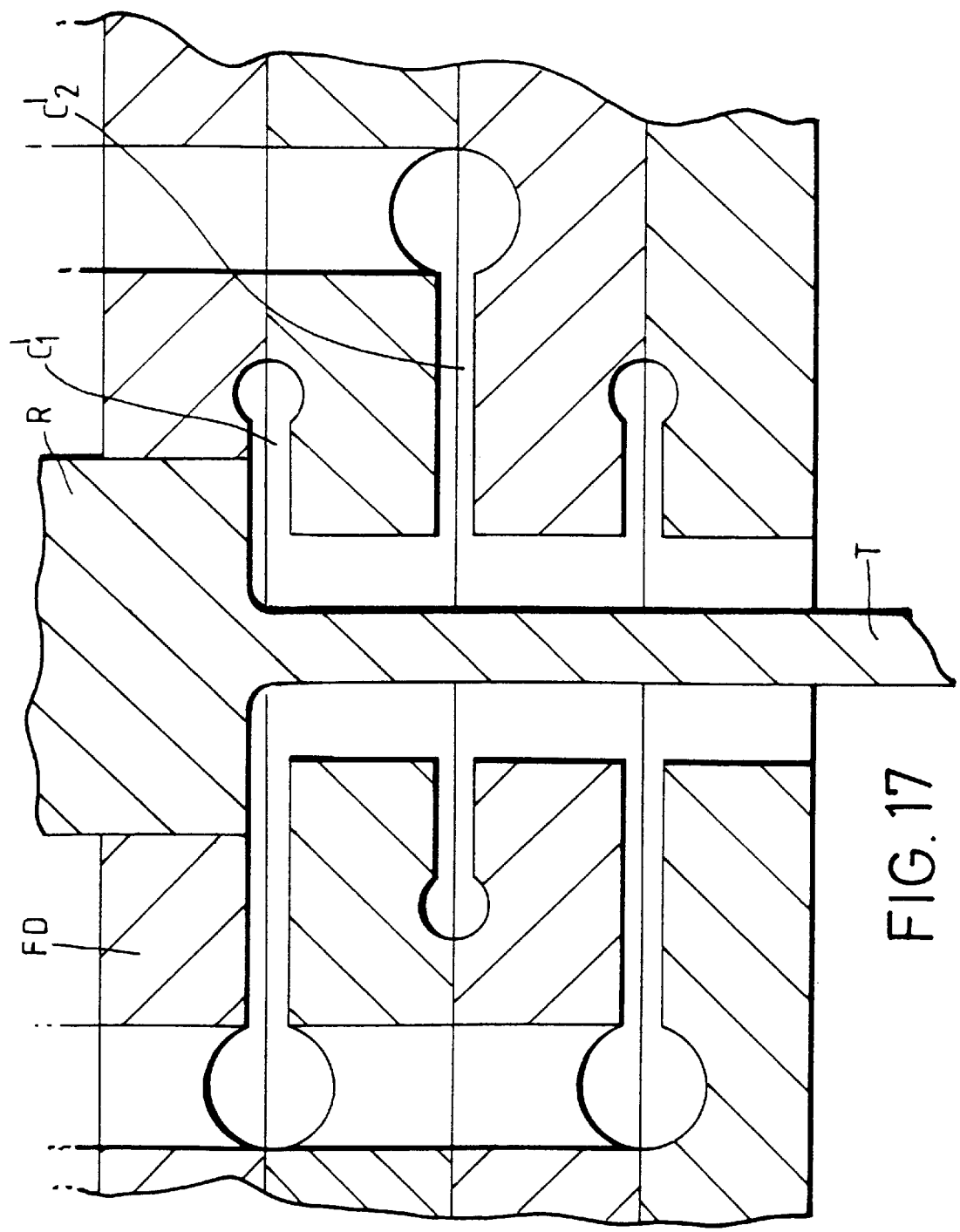
FIG. 17 is an enlarged cross-section of the combining means and moveable throttle valve of FIG. 16.
Figure 18:
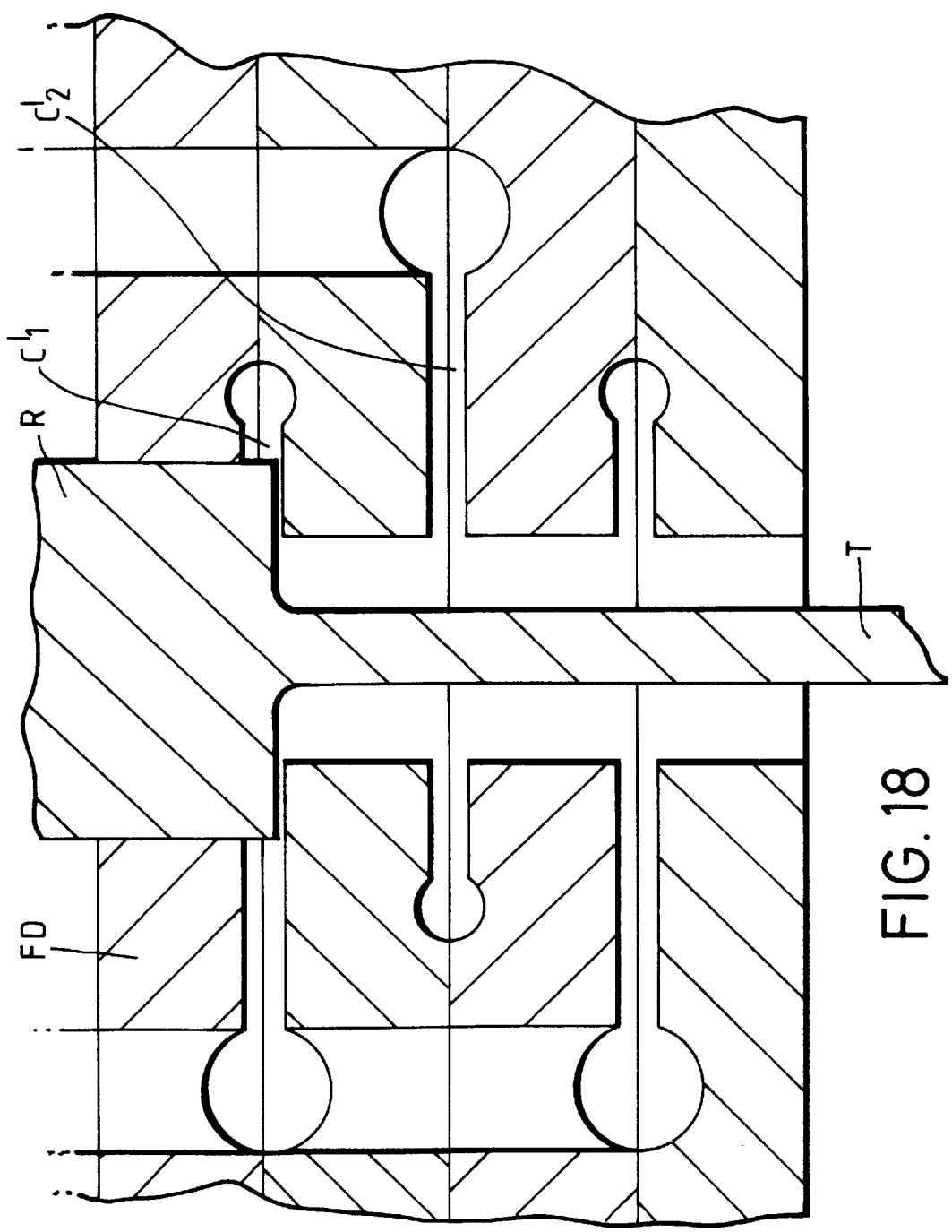
FIGS. 18 and 19 are annular to FIG. 17, showing the valve in a neutral position, with throttle positions for reduced and increased inner layer flow rates, respectively.
Figure 19:
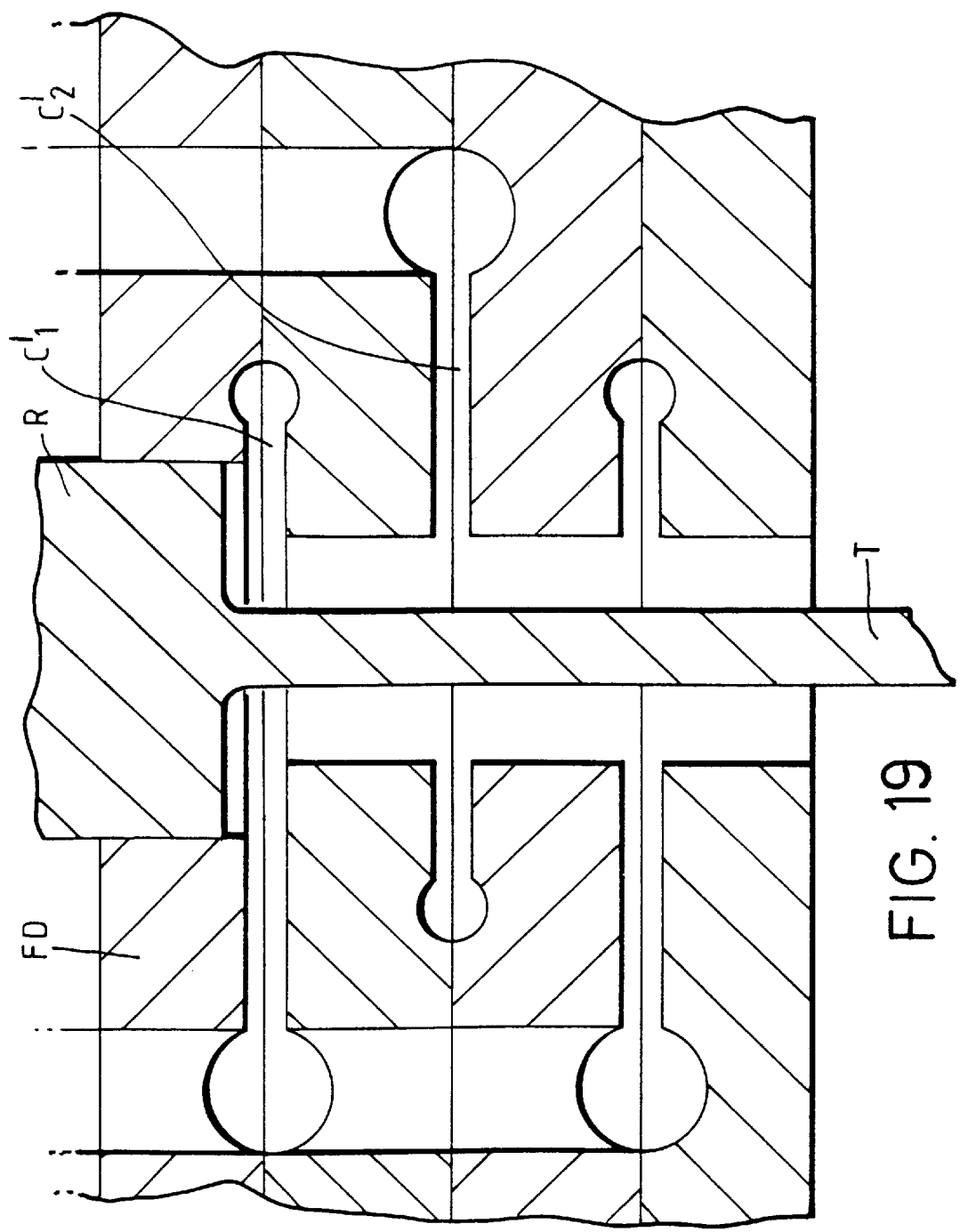

In the enlarged views of FIGS. 17, 18 and 19, the throttle valve T is shown positioned by the rod R in a neutral position with disc channels $C_1'$, $C_2'$, etc. open to balance inner layer flow with respect to the outer layer flow; in a lower position to reduce the inner layer flow rate with respect to the outer layer flow rate (FIG. 18); and in an elevated position, FIG. 19, to increase the inner layer flow rate with respect to the outer layer flow rate.

Figure 20:
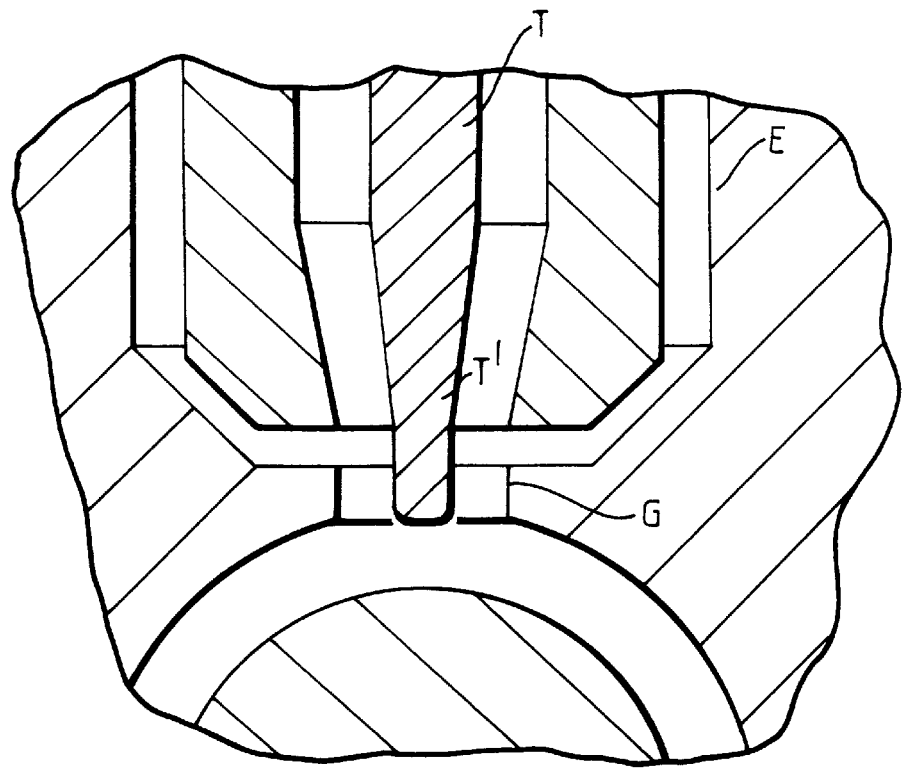
FIG. 20 illustrates, on an enlarged scale, the relative locations of the nozzle end and gate into the cavity wherein the throttle valve maintains the desired annular flow to the cavity.
Figure 21:
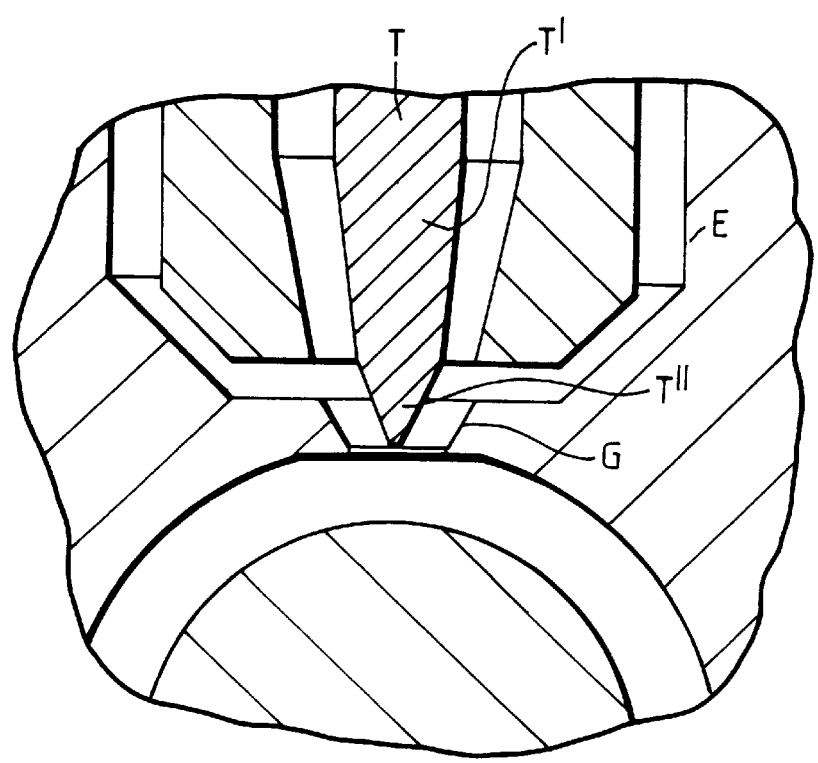
FIG. 21 is similar to FIG. 20, but provides a conical valve corresponding to a conical gate to produce a reduced gate mark on the molded part.

Turning, now, to the distal or gate end of the extruder nozzle structures, having adjustability of the position of the throttle pin, the position shown in FIG. 20 enables the throttle valve pin to maintain annular flow to the cavity as before described. To produce a reduced gate vestige height, the distal end of the throttle valve pin T is conically further tapered at T'" as it approaches the cavity end of the gate G, as in FIG. 21. The shape of this distal end with respect to the gate length, taper and diameter is of the same nature as that used to produce a reduced gate vestige height on single material molded parts, because the material in the gate area at the initiation and termination of each cycle is only outer layer material.

Figure 22:
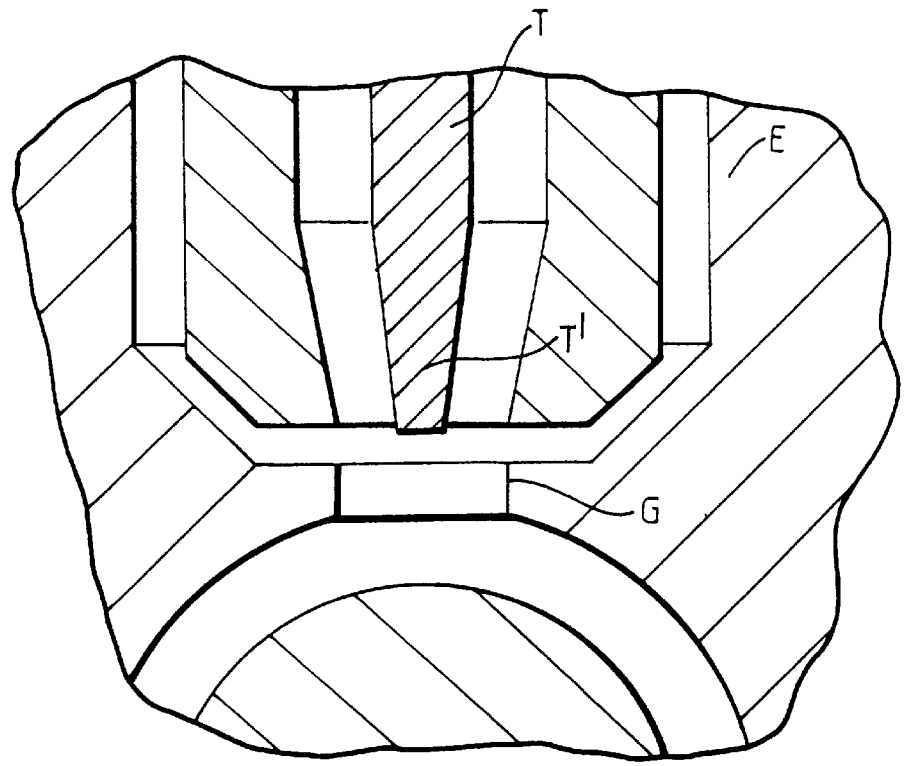
FIG. 22 is again similar to FIG. 20, but the throttle valve is terminated prior to the gate to allow molding of plastics that require an open gate.

Some molding materials, however, such as PET (Polyethylene Terephtholate), require that the gate flow be cylindrical rather than annular. In the embodiment of FIG. 22, adjusted for such materials, the throttle valve pin terminates at the end of the nozzle means so that cylindrical flow occurs only through the gate G, thereby minimizing the possible detrimental effects on the core (interior) layer leading edge.

To produce a zero gate height vestige, the moveable throttle valve pin may have a distal end shaped with respect to the gate length, taper and diameter similar to those used to produce a zero gate vestige height in single material molding.

Figure 23:
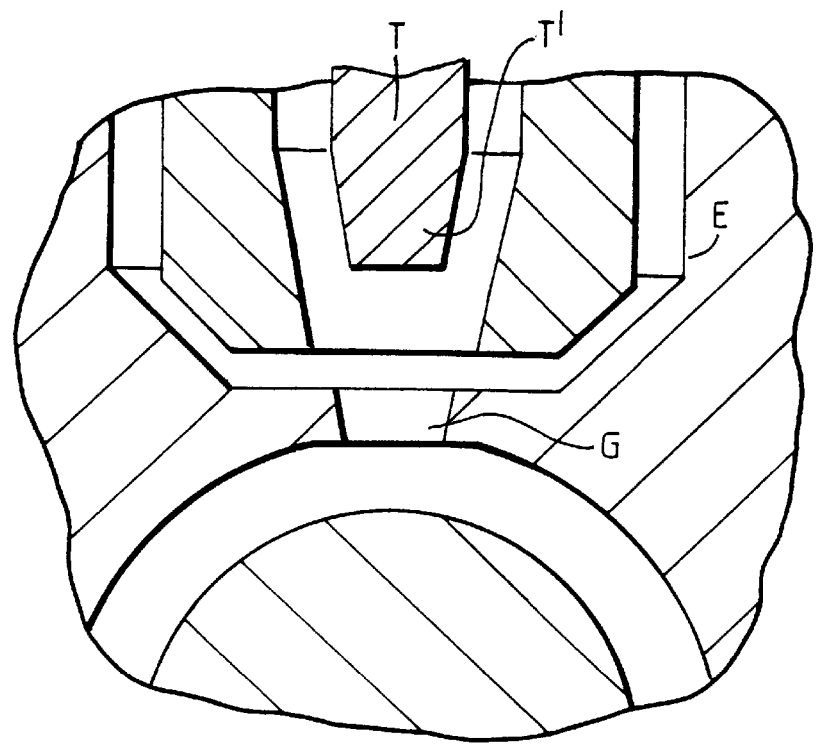
FIG. 23 is once more similar to FIGS. 20 and 22 but the throttle valve is adjusted to act as a gate valve, shown in the open position; whereas in FIG. 24, it is shown in the closed position.
Figure 24:
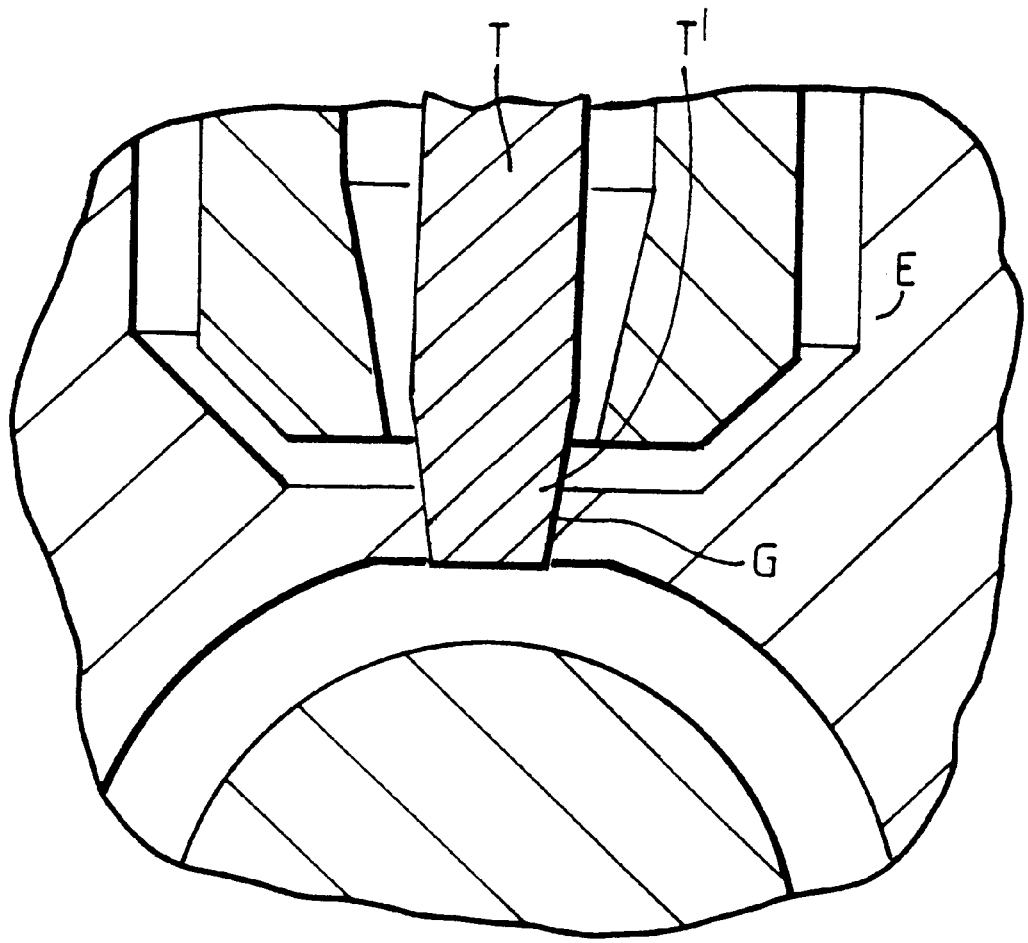

The throttle valve may be adjusted, furthermore, to serve also as a gate valve at the gate into cavity region, if desired; shown in open position in FIG. 23, and in closed position in FIG. 24.

Figure 25:
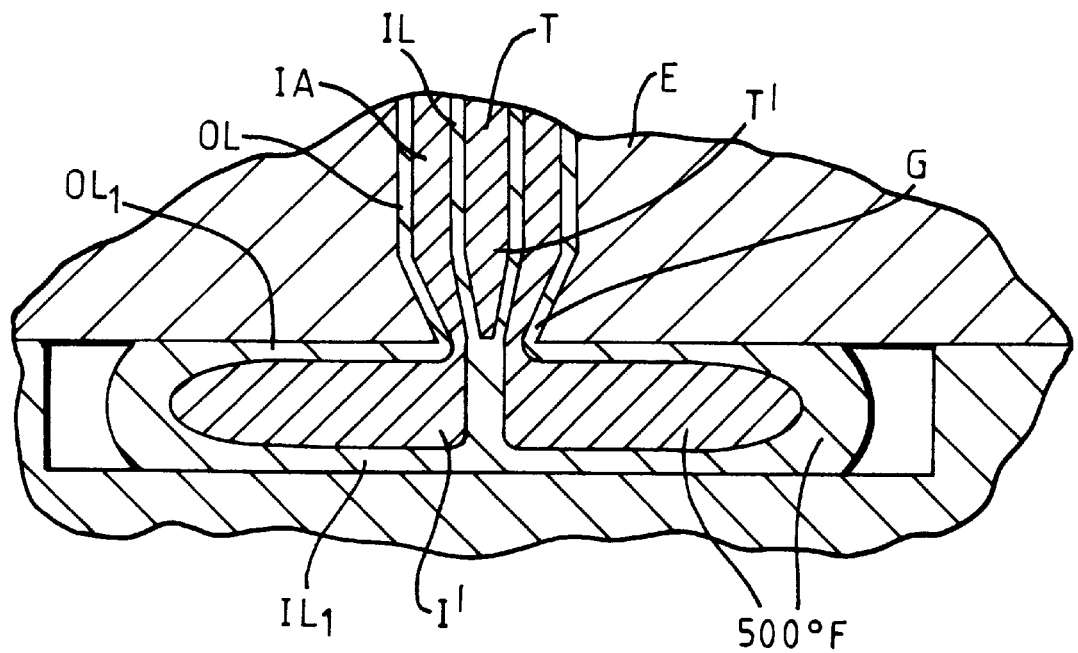
FIG. 25 is a cross-section of the nozzle end of the invention, the gate and a partially filled cavity, showing outer layers and core (interior) layer operated at the same temperature; whereas in FIG. 26, the outer layers are injected at a much higher temperature than the core (interior) layer.
Figure 26:
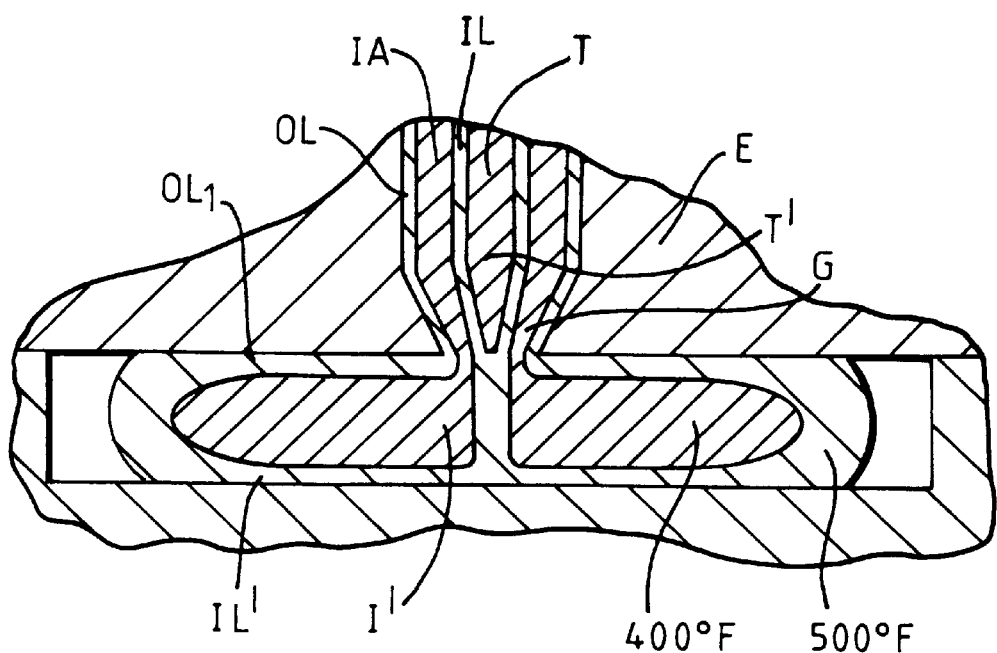

It has earlier been mentioned that the novel structures of the present invention lend themselves to great flexibility in the use at similar or different temperatures. In the extrusion into the cavity shown in FIG. 25, similar to that of before-discussed FIG. 2, the system is illustrated as operated with the horizontally flowing annular outer layers OL and IL containing encased therewithin the annular core (interior) layer IA, at the same melt temperature of, for example, about 500° F., for ABS type plastics, during transversely splitting in opposite lateral directions into the cavity, producing the same-temperature filling of the cavity of the outer layers, $OL_1$ and $IL_1$, covering or encasing the core material I'. In FIG. 26, on the other hand, the system readily enables a cooler core material I', say 400° F., as for the reasons before explained, extruded and molded with hotter outer layers $OL_1$ and $IL_1$, of, say 500° F.; and so on, for any desired variations depending on the plastic material properties and the desired molded effects.

Figure 28:
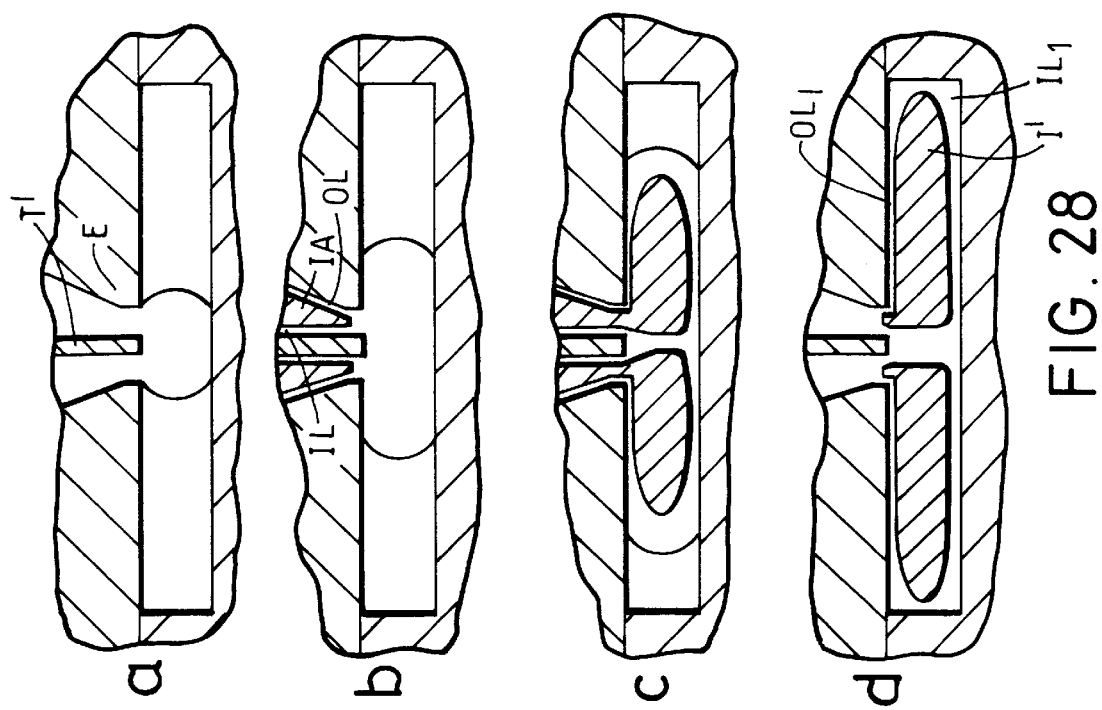
FIGS. 28(a)–(d) are similar to FIGS. 27(a)–(d) but show a fill sequence for a core (interior) layer wherein the maximum amount of core is injected into the molded part using a fixed throttle valve.
Figure 27:
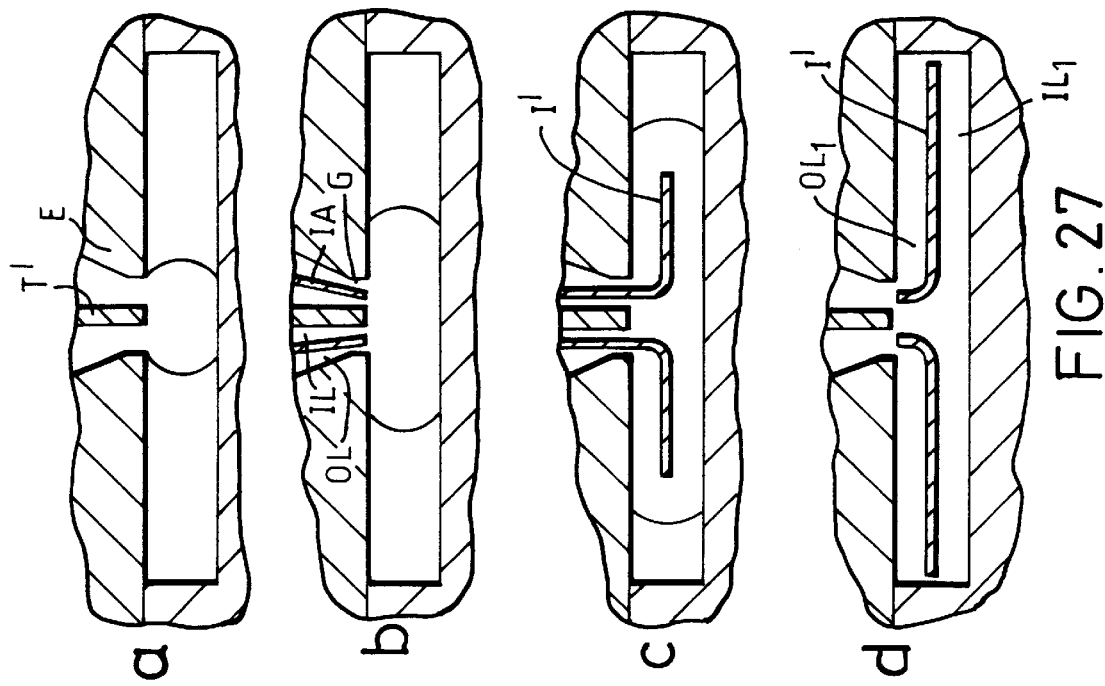
FIGS. 27(a)–(d) show the fill sequence for a core (interior) layer that is uniformly distributed throughout the molded part.

It is next in order to examine the annularly extruded material filling sequence within the mold cavity for an inner core layer I (EVOH, for example), as shown in successive FIGS. 27(a), (b), (c), and (d), demonstrating the remarkably uniform distribution attainable with the structures of the invention as the concentric annular plastic streams split on opposite sides of the throttle or restrictor element T' and inject into opposite sides of the mold cavity, (the relatively thick outer layers being of, for example, PET). In FIGS. 28(a), (b), (c) an (d), the same fill sequence is shown for the injection of a maximum amount of core material I' in the molded part (polycarbonate, for example), this being achieved with a fixed throttle valve pin T', as shown, producing outer layer flow (recycled polycarbonate plastic, for example), equally distributed between inner and outer annular layers IL and OL.

Figure 30:
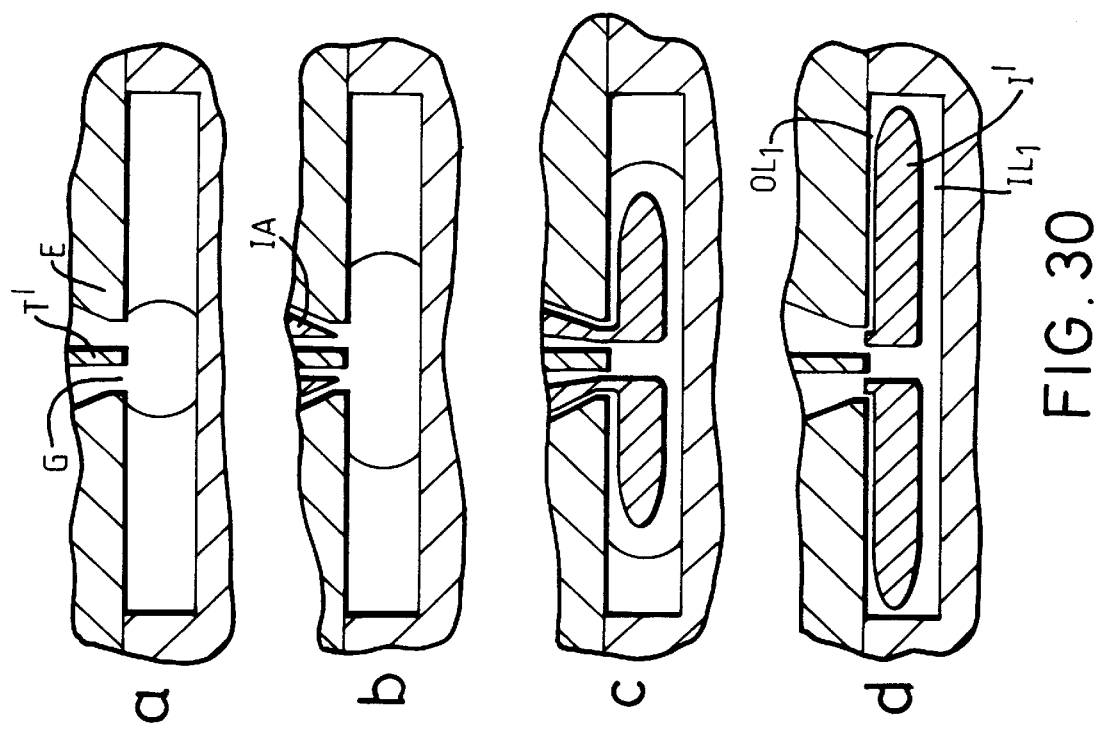
FIG. 30 shows the reverse.
Figure 29:
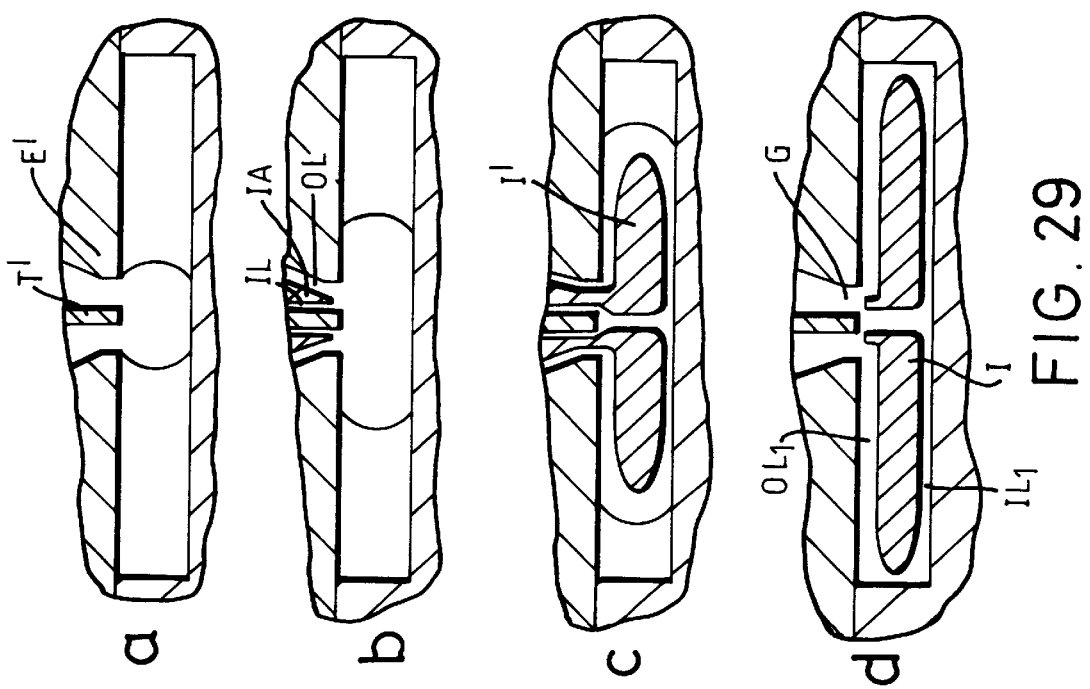
Figure 31:
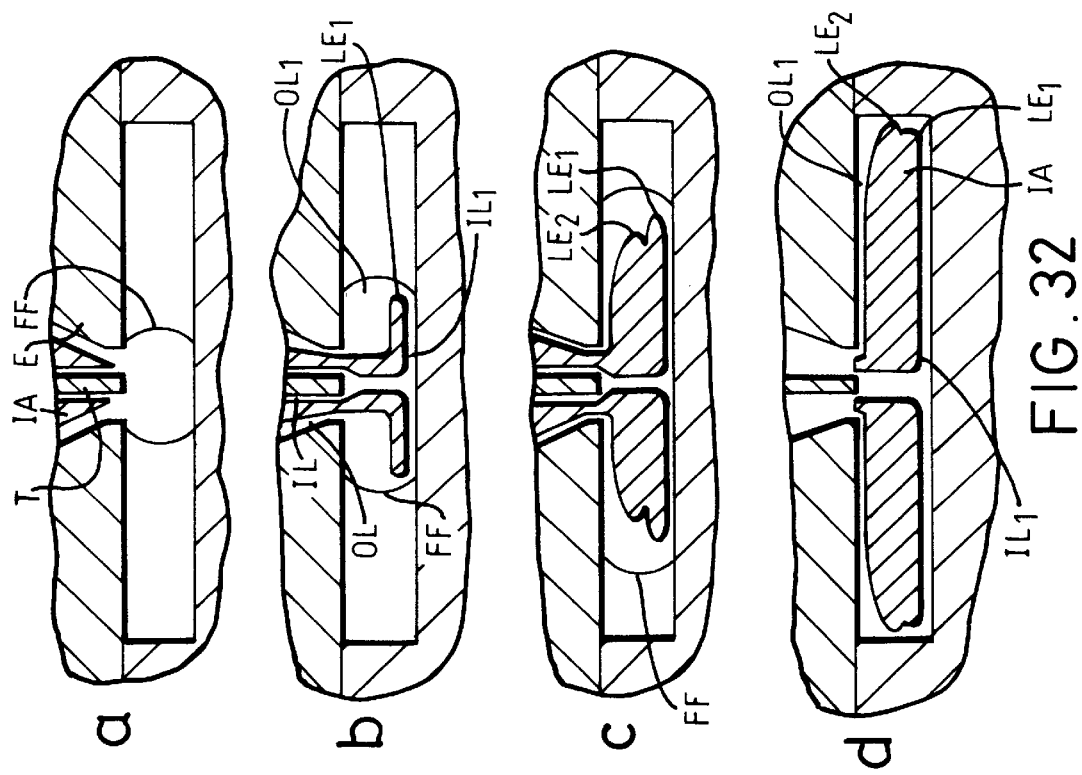
FIG. 31 is a cross-section of the gate and cavity area, showing the fill sequence using a moveable throttle valve, increasing the inner annular layer flow relative to the outer annular layer during the flow shown in FIG. 31(b), thereby injecting more core (interior) layer material into the gate-side of the molded part.
Figure 32:
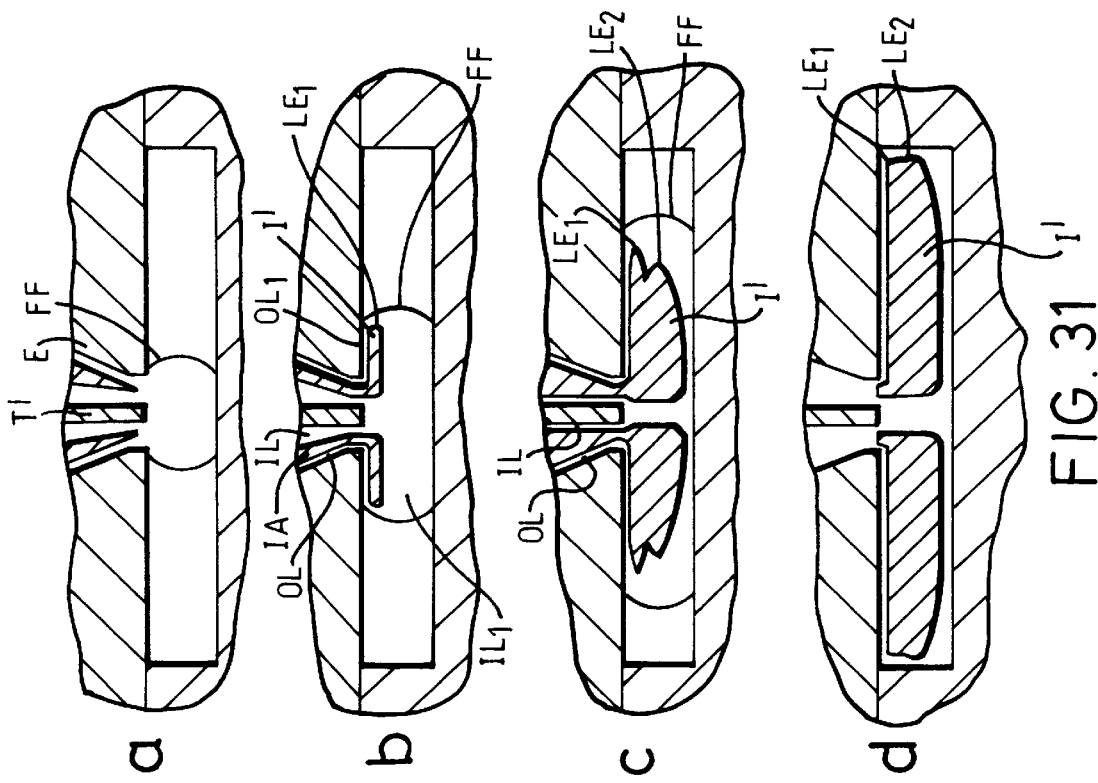
FIG. 32 is a cross section of the gate and cavity area showing the fill sequence wherein the throttle valve moves to decrease the inner annular layer flow relative to the outer annular layer (i. e. the opposite relative flow to FIG. 31) during the flow shown in FIG. 32(B), thereby injecting more core (interior) layer material into the molded part side opposite the gate.

The flexibility of the adjustable throttle structure of the invention is further illustrated in FIGS. 29(a)–(d), showing the cavity filling sequence again for a maximum amount of inner core material in the molded part, but using a throttle valve adjustment that produced an outer layer flow OL at a greater rate relative to the inner annular layer IL to effect a thicker outer layer OL on the gate side of the molded part (FIG. 29(d)), than the inner layer $IL_1$. The operation in FIGS. 30(a)–(d) produces the reverse, with the layer $IL_1$, thicker than the gate side layer OL, of the molded part (FIG. 30(d)). The position of the moveable throttle pin R shown in FIG. 20 will produce the increased OL and $OL_1$ of FIG. 29. The position of moveable throttle pin shown in FIG. 19 will produce the increased IL and $IL_1$ of FIG. 30. For embodiments using a fixed throttle pin, for example T of FIG. 15, the relative thickness difference of $OL_1$ and $IL_1$ can be created by appropriate corresponding design of combining means channels $C_1$' and $C_3$' of FIG. 13 and $C_1$" of FIGS. 14 and 15.

FIGS. 31(a)–(d) and 32(a)–(d) are similar cross-sectional sketches of the cavity filling sequences using a moveable throttle valve element, respectively increasing the inner annular layer flow and the outer annular layer flow for injecting more core (interior) layer I' into the gate side and opposite the gate side, respectively, of the molded part.

An adjustment of the relative flow rate of OL, IA and IL occurs during each extrusion. The relative volumes and flow rates of core layer and covering layers is controlled by $S_1$ and $S_2$, while the relative flow rates between the covering layers is controlled by adjustment of moveable throttle R of FIG. 17, for example. During each extrusion, $S_1$, $S_2$ and R are controlled to produce a core layer I' that has a leading edge $LE_1$ that is flowing along a streamline which has a V/$\bar{V}$ that prevents $LE_1$ from breaking through the flow front FF of the covering layers. After the FF has progressed further into the cavity away from the gate G, the rate of flow of core layer IA is increased relative to the flow of covering layers OL and IL and the relative flow rates of OL and IL are adjusted closer to a neutral position of R such that a core leading edge $LE_2$ is created long the maximum velocity streamline of the cavity. $LE_2$ flowing at a higher velocity than $LE_1$ will penetrate shallower, the same or deeper into the cavity than $LE_1$ depending on the timing of the adjustment of $S_1$, $S_2$ and R during the extrusion. The moveable throttle pin allows the creation of $LE_1$ before creation of $LE_2$, thus more core layer volume can be injected into a cavity than in prior art which can create only one core leading edge in each extrusion cycle.

Figure 33:
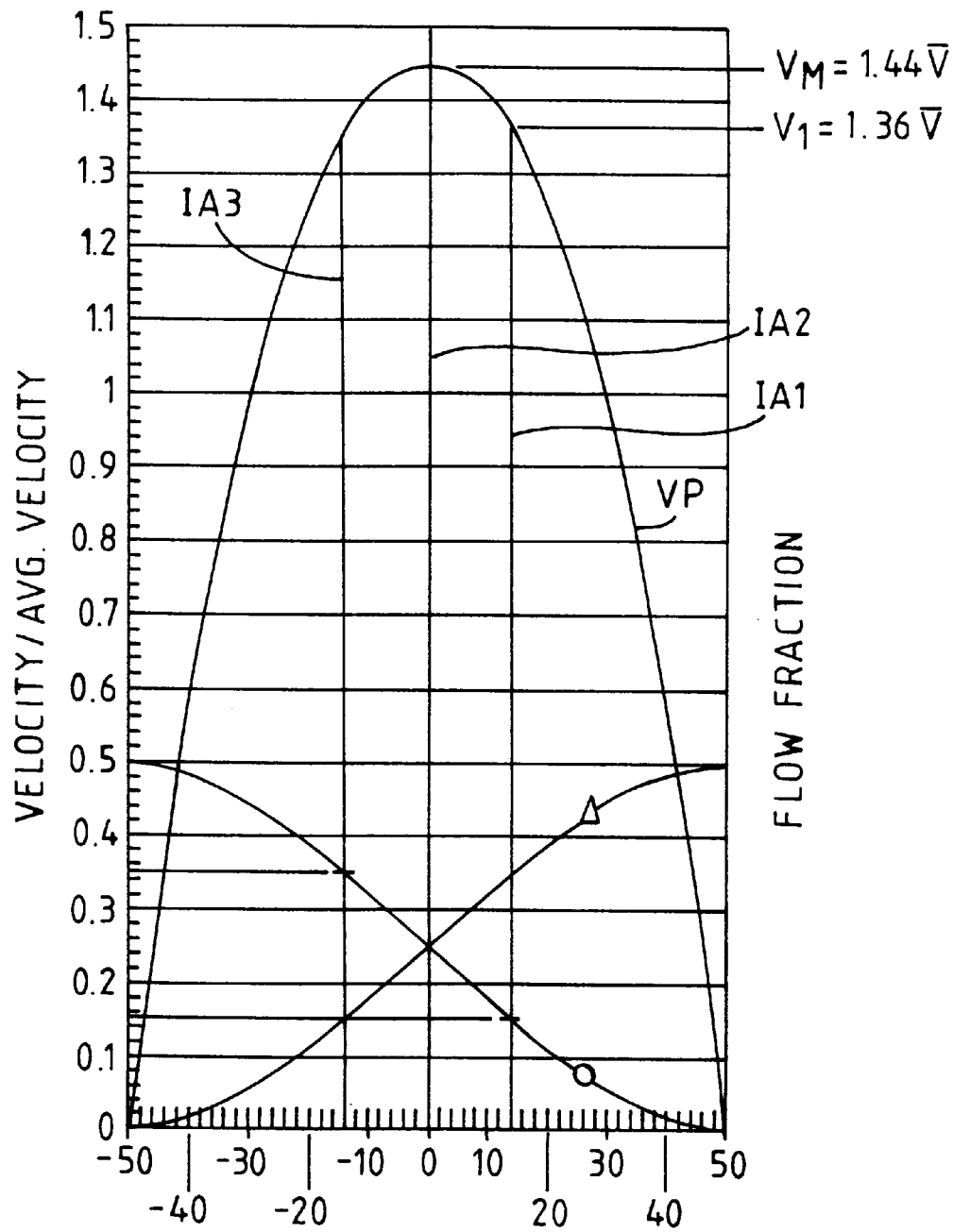
FIG. 33 is a graph plotting velocity/average velocity and flow fraction in the annular channel and cavity.

A comparison of the flow fraction and velocity profile plots of FIGS. 33) and 34, for the throttled annular channel flow of the invention and of the prior art cylindrical channel, respectively, graphically demonstrates the significantly improved characteristics attained by the invention.

FIG. 33 is the velocity profile Vp=V/$\bar{V}$ and volumetric fraction of the annular flow between the channel formed by the throttle valve pin and the cylindrical wall of the extruder body, represented by –50% and +50%, respectively, on the horizontal axis of the graph. The mean diameter of flow is represented as the "0" on the horizontal axis. The velocity profile and flow fraction is based on the Power Lw model for non-Newtonian fluids (Ref. J. S. Brydson, *Flow Properties of Polymer Melts*, second edition, George Godwin Limited in association with the Plastics and Rubber Institute).

If the design and construction of the channels $C_1$', $C_2$', etc., as shown in FIG. 13, etc., in the combining means produces perfectly annular flow of the inner and outer annular layers, the core leading edge streamline will be centered on the mean diameter of flow, and thus is has a velocity Vm equal to 1.44×the average velocity $\bar{V}$ of the combined annular flow.

In actual equipment construction and operation, the annular distribution of the inner and outer annular layers is not perfect, and a 10% maldistribution is not unexpected within the normal tolerances of channel fabrication, processing temperature distribution and plastic melt property variations. The effect of such a maldistribution is shown in FIG. 4 where the core annular layer IA is biased away from the mean diameter of the annular channel. The three streamlines IA1, IA2, IA3, in FIG. 33 correspond to the three points of the core annular layers shown in FIG. 4 as IA1, IA2, IA3. The maximum velocity difference between points on the core leading edge is that between streamlines IA1 and IA2. It can be shown that the leading edge tape is calculated by the following equation:

$$\Delta l = \Delta V \times L$$

where
$\Delta L$=leading edge taper
$\Delta V$=difference in velocity/$\overline{V}$
L=total length of combined flow
For the aforementioned maldistribution, $$\Delta V = V_M - V_1 = 1.44\ \overline{V} - 1.36\ \overline{V} = 0.08\ \overline{V}$$

L=75 mm for the example shown in FIG. 11
therefore,
$\Delta l$=6 mm, as shown in FIG. 11.

A leading edge taper of 6 mm is about the maximum acceptable taper for a core layer used as a gas barrier layer in PET container preforms. Thus, an annular combined flow downstream of the combining means allows up to 75 mm length between the area of combination and the gate into the cavity. This allows normal amount of mold cooling to be built around the gate area of the mold.

FIG. 34, is the velocity profile and volumetric fraction for circular flow channels that are used in prior art between the area of combination and the gate into the cavity. The wall of the flow channel is represented by −100% and +100% on the horizontal axis. The mean diameter of flow, i.e. 50% of flow volume flows within this diameter and 50% flows between this diameter and the wall of the channel, is shown as IA' in FIG. 5 and FIG. 34. For flows, wherein the core layer IA' flows between and inner cylindrical layer I1' that has the same volumetric flow rate as the outer annular layer OL' of FIG. 5, the leading edge of the core layer will flow along a streamline on the mean diameter of flow. If the flow created by the combining means is perfectly annular, there will be no taper of the core leading edge when the leading edge exits the gate into the cavity.

Since perfect annular flow is not realistically possible as discussed, the effect of a 10% maldistribution as shown in FIG. 6 where the core layer is biased away from the mean diameter of flow will result in the flow with a high and low velocity of the core leading edge corresponding to IA'1 and IA'3 of FIG. 6 and FIG. 34. Using the previous calculations, the difference of 0.53 $\overline{V}$ between the high and low velocities of the leading edge will produce a 39.8 mm taper in the cavity, as shown in FIG. 12, if the length of the cylindrical channel is 75 mm between the combination area and the cavity side of the gate. This magnitude is nearly a factor of 10 larger than the minimal acceptable taper in most applications.

Obviously, prior art required that the cooling of the mold cavity be compromised in order to shorten the length of the combined flow. To achieve the same taper of 6 mm as shown in FIG. 11, the prior art length of flow must be about 11 mm for the maldistribution of 10%. This length is about what is used in existing molding systems.

Further modifications will also occur to those skilled in this art and such are considered to fall within the spirit and scope of the invention as defined in the appended claims.

What is claimed is:

1. Apparatus for co-extruding multiple plastic materials as for injecting through a gate region into a mold cavity to produce a molded product, having, in combination, plastic material flowing stream sources; means for combining streams of such flowing plastic materials with at least one interior stream that is to serve as an interior core of a resulting molded plastic product within interior and outer streams of plastic material to serve as covering plastic material layers; a longitudinally extending hollow extruder connected to the combining means to receive the outer and interior streams; flow restrictor disposed within and along the extruder to force the combined streams to flow along concentric annular flow paths within and along a longitudinally extending tubular extruder to the cavity gate region, with the annular interior core stream encased by inner and outer annular covering plastic material stream layers; the mold cavity at the gate region being shaped for splitting the concentric annular streams along opposite transverse directions to inject into corresponding opposite transverse sections of the cavity.

2. Apparatus as claimed in claim 1 and in which the flow restrictor comprises a throttle pin longitudinally extending centrally within and along the extruder toward a distal end opening at the gate region.

3. Apparatus as claimed in claim 2 and in which the throttle pin is fixed in position.

4. Apparatus as claimed in claim 2 in which the throttle pin is longitudinally movably adjustable to vary the positions of the distal end of the pin and the extruder gate region opening.

5. Apparatus as claimed in claim 2 and in which means are provided for adjusting the throttle pin to adjust the flow so that the annular interior core layer flows along a path of substantially zero gradient of the flow velocity profile transversely of the extruder.

6. Apparatus as claimed in claim 5 and in which said adjusting means controls the flow through the gate region and within the cavity to maintain the path of the interior core layer at substantially zero gradient of the transverse flow velocity profile therein.

7. Apparatus as claimed in claim 1 and in which temperatures of the flowing core and outer and inner plastic streams are of substantially the same value within the cavity.

8. Apparatus as claimed in claim 1 and in which means is provided for setting the temperatures of the flowing core and outer and inner plastic streams to different values within the cavity.

9. Apparatus as claimed in claim 8 and in which the core plastic stream temperature is at a value lower than the outer and inner plastic stream temperature.

10. Apparatus as claimed in claim 4 and in which the streams are combined by flowing along successive passages between parallel planes.

11. Apparatus as claimed in claim 2 and in which the throttle pin is tapered at its distal end.

12. Apparatus as claimed in claim 1 and in which the flow restrictor is adjustable to provide more or less flow for the inner stream relative to the outer stream.

13. Apparatus as claimed in claim 2 and in which the annular flows are confined along the extruder between concentric cylindrical shells therein.

14. Apparatus as claimed in claim 5 and in which core layer flow in the zero gradient path just upstream and through the gate region.

15. Apparatus as claimed in claim 5 and in which the throttle pin terminates just upstream on the cavity side of the gate region.

16. Apparatus as claimed in claim 5 and in which the throttle pin adjustment causes the flow to provide a core layer leading edge flowing along the zero gradient before or after another layer leading edge flow offset from the zero gradient path.

* * * * *